(12) United States Patent
Johnson et al.

(10) Patent No.: US 11,041,117 B2
(45) Date of Patent: Jun. 22, 2021

(54) ENCAPSULATION AND CONTROLLED DELIVERY OF STRONG MINERAL ACIDS

(71) Applicants: Aramco Services Company, Houston, TX (US); RTI International, Research Triangle Park, NC (US)

(72) Inventors: Leah M. Johnson, Durham, NC (US); Ghaithan Al-Muntasheri, Houston, TX (US); Ginger Denison Rothrock, Cary, NC (US); Sarah Shepherd, Raleigh, NC (US)

(73) Assignees: ARAMCO SERVICES COMPANY, Houston, TX (US); RTI INTERNATIONAL, Research Triangle Park, NC (US)

( * ) Notice: Subject to any disclaimer, the term of this patent is extended or adjusted under 35 U.S.C. 154(b) by 0 days.

(21) Appl. No.: 16/675,024

(22) Filed: Nov. 5, 2019

(65) Prior Publication Data

US 2020/0231869 A1 Jul. 23, 2020

Related U.S. Application Data

(62) Division of application No. 15/456,015, filed on Mar. 10, 2017, now Pat. No. 10,501,687, which is a division of application No. 14/333,879, filed on Jul. 17, 2014, now Pat. No. 9,631,139.

(51) Int. Cl.
| | |
|---|---|
| *C09K 8/92* | (2006.01) |
| *C09K 8/88* | (2006.01) |
| *C09K 8/82* | (2006.01) |
| *E21B 43/25* | (2006.01) |
| *C09K 8/72* | (2006.01) |

(52) U.S. Cl.
CPC ............... *C09K 8/882* (2013.01); *C09K 8/72* (2013.01); *C09K 8/725* (2013.01); *C09K 8/82* (2013.01); *C09K 8/92* (2013.01); *E21B 43/25* (2013.01); *C09K 2208/14* (2013.01)

(58) Field of Classification Search
CPC ...... C09K 2208/14; C09K 8/72; C09K 8/725; C09K 8/82; C09K 8/882; C09K 8/92; E21B 43/25
See application file for complete search history.

(56) References Cited

U.S. PATENT DOCUMENTS

| | | | |
|---|---|---|---|
| 4,713,251 A | 12/1987 | Seighman | |
| 4,741,401 A | 5/1988 | Walles et al. | |
| 4,923,753 A | 5/1990 | Walles et al. | |
| 6,207,620 B1 | 3/2001 | Gonzalez et al. | |
| 6,761,220 B2 | 7/2004 | Blauch et al. | |
| 2005/0019574 A1* | 1/2005 | McCrary | C09C 3/10 |
| | | | 428/403 |
| 2006/0166838 A1 | 7/2006 | Collins et al. | |
| 2008/0190610 A1 | 8/2008 | Barmatov et al. | |
| 2012/0000777 A1 | 1/2012 | Garrell et al. | |
| 2016/0145459 A1* | 5/2016 | Klein | B01J 13/18 |
| | | | 504/359 |

FOREIGN PATENT DOCUMENTS

| | | |
|---|---|---|
| CN | 103911139 A | 7/2014 |
| EP | 1166866 A2 | 1/2002 |
| EP | 1333152 B1 | 5/2012 |
| WO | 9322537 A1 | 11/1993 |
| WO | 03106809 A1 | 12/2003 |
| WO | WO03/106809 * | 12/2003 |

OTHER PUBLICATIONS

International Search Report and Written Opinion for related PCT application PCT/US2015/040842 dated Oct. 2, 2015.

* cited by examiner

*Primary Examiner* — Kumar R Bhushan
(74) *Attorney, Agent, or Firm* — Bracewell LLP; Constance G. Rhebergen

(57) ABSTRACT

A polymer-encapsulated mineral acid solution and a method for forming the polymer-encapsulated mineral acid solution. Introducing a strong mineral acid solution to a monomer solution occurs such that a primary emulsion that is a water-in-oil type emulsion forms. Introducing the primary emulsion to a second aqueous solution forms a secondary emulsion that is a water-in-oil-in-water type double emulsion. The monomer in the secondary emulsion is cured such a polymerized shell forms that encapsulates the strong mineral acid solution and forms the capsule. The strong mineral acid solution has up to 30 wt. % strong mineral acid. A method of stimulating a hydrocarbon-bearing formation using the polymer-encapsulated mineral acid solution includes introducing a capsule suspension into a fissure in the hydrocarbon-bearing formation to be stimulated through a face in a well bore. The capsule is maintained within the fissure until the polymer shell degrades.

12 Claims, 26 Drawing Sheets

ENCAPSULATION AND CONTROLLED DELIVERY OF STRONG MINERAL ACIDS

RELATED APPLICATIONS

This application is a divisional application of U.S. patent application Ser. No. 15/456,015 filed on Mar. 10, 2017, which is a divisional application of U.S. patent application Ser. No. 14/333,879 filed on Jul. 17, 2014 now issued as U.S. Pat. No. 9,631,139. For purposes of United States patent practice, this application incorporates the contents of both patent applications by reference in their entirety.

BACKGROUND OF THE INVENTION

Field of the Invention

The field of invention relates to the stimulation of oil and gas wells. More specifically, the field relates to the use of encapsulated acids for stimulating oil and gas wells.

Description of the Related Art

For carbonate hydrocarbon-bearing formations having fractures, fissures and other natural and man-made hydrocarbon conduits through the formation, stimulation by conventional fracture acid treatments (strong mineral acids like HCl, $H_2SO_4$, HF, and $HNO_3$) have experienced challenges. The significant problem with directing conventional fracture acid treatments though such fractures or fissures to improve production and hydrocarbon fluid flow is due to the reactivity of the acid itself with carbonates. Unless the carbonate has been passivated or coated with a neutral material, the acid or solution of acid reacts with the portion of the hydrocarbon-bearing formation that it immediately contacts: the portion proximate to the wellbore. Reacting close to the face or wall of the wellbore achieves little to no fracture conductivity improvement along the entire fracture length or through the hydrocarbon-bearing formation.

Traditional methods to retard or delay the reaction of strong mineral acids include acid gelation, acid-in-oil (W/O) emulsification and adsorption of surfactants on the rock face. Each of these techniques has limitations. The acid-in-oil emulsification and the acid gelation exist in a metastable/unstable state that may easily break down without any controlled mechanism of release. Other limitations include reduction in acid efficiency; increase in cost and complexity due to the additives, especially surfactants; poor control over penetration depth thought he formation; and the need to use corrosion inhibitors as some of the additives attach the metals of the casing and well tools.

Acid fracturing with an acid-in-oil (W/O) emulsification is a technique where the strong mineral acid is surrounded by a hydrocarbon liquid such as diesel. The diesel provides a liquid hydrophobic barrier that upon contact with a sharp or hydrocarbon-bearing surface, or upon introduction of an emulsion breaker, would permit the acid solution to be released. Once the emulsion breaks the strong mineral acid is able to react with the carbonate rock. The two main problems with this technique are that there is a lack of control over the acid release and the questionable shear resistance of the emulsion itself. The result of such an application is a less localized, moderately deeper into the formation but still unevenly distributed fracture conductivity improvement.

Other alternatives include the use of weaker organic acids, including citric acid. The results have been mixed. In general, weaker organic acids exhibit a significantly lower bulk dissolution capacity than strong mineral acids. They are generally more expensive per equivalent acid volume. Organic acids, however, do demonstrate an ability to perform such that there is greater etched fissure conductivity than with traditional mineral acid application. It is noted that some care must be taken with the use of organic acids utilized downhole in the balance between etch properties and precipitation. It is understood that in carbonate formations that the increase in released calcium ions during carbonate rock dissolution can cause secondary precipitation, which can then end up clogging up equipment or formation pores that were being attempted to clear. Note that the combination of strong mineral acids with organic acids is used in wells with special types of tubing.

There is a need for the downhole application of a simpler acid application system that applies the power of strong mineral acids in a way that achieves the precision etching of organic acids. Such a system should be easy to use and improve etched fissure conductivity over conventional fracture acid treatments.

SUMMARY OF THE INVENTION

A method for forming a polymer-encapsulated mineral acid solution includes introducing a strong mineral acid solution to a monomer solution. The strong mineral acid solution comprises a strong mineral acid that is in a range of from greater than 0 wt. % to 30 wt. % of the strong mineral acid solution. The monomer solution comprises a monomer and a free-radical initiator. The monomer is hydrophobic. The monomer is also operable to polymerize upon initiation of a free-radical chain polymerization reaction. The introduction occurs such that a primary emulsion forms. The primary emulsion is a water-in-oil (W/O) type emulsion. The method also includes introducing the primary emulsion to a second aqueous solution. A secondary emulsion forms. The secondary emulsion is a water-in-oil-in-water (W/O/W) type double emulsion. The method includes converting the free-radical initiator in the monomer solution. A free-radical chain polymerization reaction is initiated in the monomer solution. The polymerized shell forms. The polymerized shell encapsulates and prevents interaction with the strong mineral acid solution until the polymerized shell degrades. The strong mineral acid solution does not degrade the polymerized shell. The secondary emulsion converts into the polymer-encapsulated mineral acid solution.

The polymer-encapsulated mineral acid solution includes the strong mineral acid solution. The strong mineral acid is in the range of from greater than 0 wt. % to about 30 wt. % of the solution. The capsule also includes the polymerized shell that encapsulates the strong mineral acid solution. The polymerized shell encapsulates and prevents interaction with the strong mineral acid solution until the polymerized shell degrades. The strong mineral acid solution does not degrade the polymerized shell. In an embodiment of the capsules, the polymer shell has a degradation period of about 2 hours at 350° F. In an embodiment of the capsules, the polymer shell has a degradation period of about 4 hours at 300° F. In an embodiment of the capsules, the polymer shell has a degradation period is about 8 hours at 275° F.

A polymer-encapsulated mineral acid solution suspension includes a polymer-encapsulated mineral acid solution and a suspension fluid. In an embodiment of the suspension, the suspension fluid is artificial brine. An artificial brine comprising NaCl and $CaCl_2$ is useful. In another embodiment of the suspension, the suspension fluid is produced formation water. The total dissolved solids in the suspension may be in a range of from greater than 0 to about 40,000 parts-per-million (ppm). In an embodiment, the suspension fluid further comprises an acidic compound.

A method of stimulating a hydrocarbon-bearing formation using a polymer-encapsulated mineral acid solution includes introducing the polymer-encapsulated mineral acid solution suspension into a fissure in the hydrocarbon-bearing formation to be stimulated through a face in a well bore. The well bore is defined by a well bore wall and traverses the hydrocarbon-bearing formation. The face is a portion of the well bore wall associated with and operable to provide fluid communication between the hydrocarbon-bearing formation and the well bore. The fissure in the hydrocarbon-bearing formation is accessible through the face. The method also includes maintaining the polymer-encapsulated mineral acid solution within the fissure. The polymer shell degrades within the fissure where the strong mineral acid solution is released into the fissure of the hydrocarbon-bearing formation. Upon interaction between the strong mineral acid and the hydrocarbon-bearing formation, the hydrocarbon-bearing formation is stimulated.

The capsules have a liquid core/polymer shell form that encapsulates the strong mineral acid solution. The capsules have a mean diameter range anywhere from the micrometer (μm) range to the nanometer (nm) range.

The core is filled with the liquid acid solution while the coating (shell) is a polymer-based material. The encapsulated strong mineral acid solution offers an attractive alternative means to achieve a continuously conductive fracture plane, with enhanced differential relief, by delivering the microparticles to nanoparticles along the fractures and fissures of the hydrocarbon-bearing formation before release. Slow, continuous releasing of the strong mineral acid solution by capsules of various designs can enable the acid etchant to diffuse slowly along the fissure and fracture conduits through the formation, increasing the effectiveness of the stimulation and resulting in improved mobility. The repeated minor acid exposures as the capsules degrade within the fractures and fissure permits the microparticles and nanoparticles of encapsulated strong mineral acid to travel further and form increased fracture length pathways through the formation than traditional acid treatments.

The polymer shell has tunable degradation profiles. The polymer shell lacks permeability initially upon introduction. The polymer shell serves as a barrier to minimize contact between the strong mineral acid and the carbonate rock such that the acid can be delivered deeper into the formation along fractures and fissures. The polymer shell is designed to degrade over a period of hours, days or weeks within a hydrocarbon-bearing formation or well bore depending on its intended use.

The polymer-encapsulated mineral acid solution enable placement of strong mineral acids deeper into the reservoir as compared to traditional hydrocarbon-emulsified acids or bare mineral or organic acids. The polymer-encapsulated mineral acid solution permit delayed and designed release of the strong mineral acid into carbonate reservoirs, which permits the acid to be delivered much deeper than it would be permitted in either bare or emulsified forms. The polymer-encapsulated mineral acid solution reduce or eliminate the contact of the strong mineral acid with injection tubing, downhole tools and casing, which mitigates corrosion due to acid exposure.

The method of forming the polymer-encapsulated mineral acid solution is challenging due to the requirement of the polymerization reaction to occur in an environment proximate to or within a strong mineral acid solution, which can prevent or accelerate the polymerization of the monomer. Certain polymerization processes, including free-radical chain polymerization, appear not to be effected by the proximity of the strong mineral acid solution and the polymerization reaction process in an adjacent liquid layer. Free-radical chain polymerization can utilize a number of hydrophobic monomers, which is a property that permits the monomer solution layer to remain separate from the strong mineral acid solution layer, such that the monomer solution layer forms the encapsulating polymer shell around the strong mineral acid solution. Balancing both inner and continuous aqueous layers of the W/O/W double emulsion during formation permits capsules with strong mineral acid solution cores having a concentration of strong mineral acid in a range of from greater than 0 wt. % to about 30 wt. %—greater than provided in previous references and with materials traditionally used for encapsulation.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

FIGS. 1-26 and their description facilitate a better understanding of and method of use for use of the polymer-encapsulated mineral acid solution and the system and method for forming polymer-encapsulated mineral acid solution. In no way should FIGS. 1-26 limit or define the scope of the invention. FIGS. 1 and 2 are simple diagrams for ease of description.

DETAILED DESCRIPTION OF THE PREFERRED EMBODIMENTS

Figure 1:
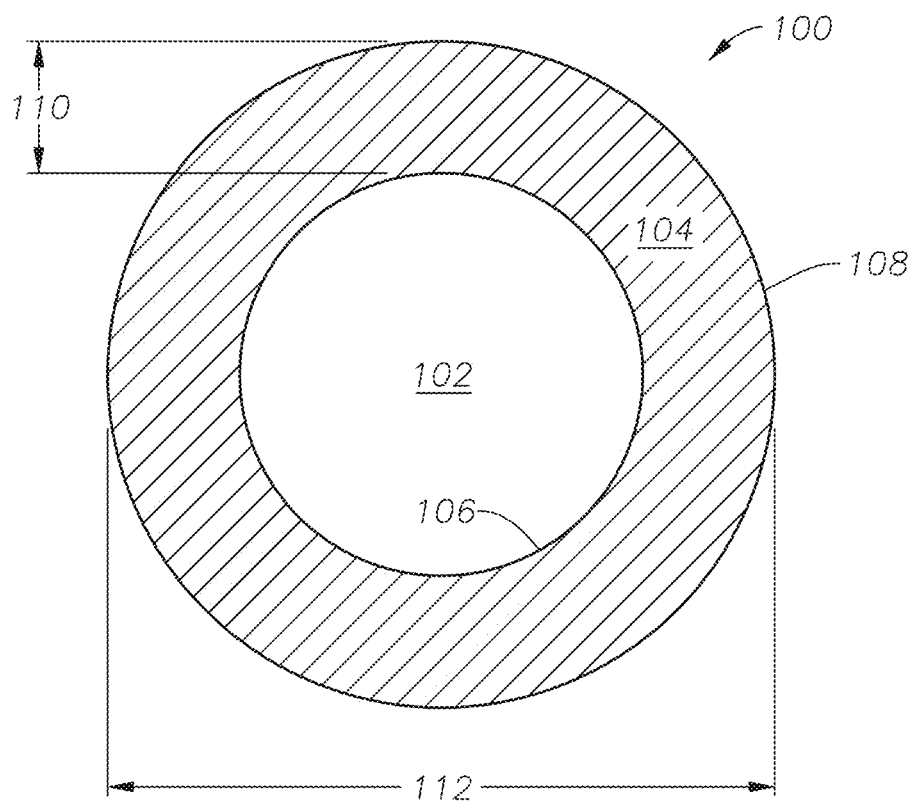
FIG. 1 is a simplified diagram of a polymer-encapsulated mineral acid solution.

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent within the context of each term. All technical and scientific terms used in the Specification and appended Claims have the same meaning as commonly understood by one of ordinary skill in the art to which the invention belongs unless defined otherwise.

As used in the Specification and appended Claims, the singular forms "a", "an" and "the" include plural references unless the context clearly indicates otherwise. The verb "comprises" and its conjugated forms should be interpreted as referring to elements, components or steps in a non-exclusive manner, and the invention illustrative disclosed suitably may be practiced in the absence of any element which is not specifically disclosed, including as "consisting essentially of" and "consisting of. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use. "Associated" and its various forms means something connected with something else because they occur together or that one produces the other. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property. "Fluids" means vapors, liquids, gases and their combinations at their present condition unless otherwise stated.

Spatial terms describe the relative position of an object or a group of objects relative to another object or group of objects. The spatial relationships apply along vertical and horizontal axes. Orientation and relational words are for descriptive convenience and are not limiting unless otherwise indicated.

Where the Specification or the appended Claims provide a range of values, it is understood that the interval encompasses each intervening value between the first limit and the second limit as well as the first limit and the second limit. The invention encompasses and bounds smaller ranges of the interval subject to any specific exclusion provided. "Substantial" means equal to or greater than 10% by the indicated unit of measure. "Significant" means equal to or greater than 1% by the indicated unit of measure.

Where the Specification and appended Claims reference a method comprising two or more defined steps, the defined steps can be carried out in any order or simultaneously except where the context excludes that possibility.

FIG. 1

FIG. 1 is a simplified diagram of a polymer-encapsulated mineral acid solution. Capsule 100 has interior 102 filled with an aqueous strong mineral acid solution. The acid in the strong mineral acid solution is in a range of from greater than 0 wt. % to about 30 wt. % of the solution. In an embodiment of the capsule, the acid in the strong mineral acid solution comprises hydrochloric acid (HCl).

Polymer shell 104 completely encompasses and contacts the aqueous strong mineral acid solution at inner surface

106. Capsule 100 also has exterior surface 108 that is also defined by polymer shell 104. Polymer shell 104 has thickness 110 as the radial distance between inner surface 106 and exterior surface 108. Thickness 110 is one of several variables that can assist in determining the time to degradation for polymer shell 104 and release of the aqueous strong mineral acid solution from interior 102. Capsule 100 also has a diameter 112, which is useful in determining the estimated depth that capsule 100 can traverse inside a formation, fissure or fracture to deliver the aqueous strong mineral acid solution.

The polymer shell is comprised of one or more monomers that have undergone polymerization such that the polymer shell forms and encapsulates the strong mineral acid solution. A polymer made from the polymerization of one monomer is a "homopolymer"; made from two monomers is a "copolymer"; made from three monomers is a "terpolymer"; and so on. In an embodiment of the capsule, the polymer of the polymer shell is a homopolymer. In an embodiment of the capsule, the polymer of the polymer shell is a copolymer. For co-polymers and higher order polymers, the organization of monomers within and along the polymer chain include alternating, periodic, statistical, random, gradient, block (di-, tri-, etc.) and graft, among others.

"End groups" are the functional units that are at the extremity of a macromolecule or oligomer, such as a monomer. Useful monomers for forming the polymer shell include monomers having acrylate functional end groups, including 1,6-hexanediol diacrylate; 1,1,1-trimethylolpropane triacrylate; 2,2-bis[4-(2-acryloxyethoxy)phenyl]propane; dipentaerythritol pentaacrylate; 1,1,1-trimethylolpropane triacrylate (TPT); and a urethane-acrylate oligomer such as the one that goes by the trade name "CN9013" (Sartomer Co., Inc.; Exton, Pa.). In an embodiment of the capsule, the polymerized shell comprises polymerized monomers having acrylate end group functionality. Useful monomers for forming the polymer shell also include monomers having methacrylate functional end groups, including diurethane dimethacrylate; Bisphenol-A glycerolate dimethacrylate; poly(ethylene glycol) dimethacrylate (having an average PEG $M_n$ of about 600); and 1,6-hexanediol dimethacrylate. In an embodiment of the capsule, the polymerized shell comprises polymerized monomers having methacrylate end group functionality. In an embodiment of the capsule, polymerized shell comprises polymerized monomers selected from the group consisting of monomer has acrylate functional end groups, methacrylate functional end groups and combinations thereof.

The interior or "backbone" structure of each monomer (the portion of the oligomer between the functional end groups) can be chosen from a wide variety of chemical groups to help tune the properties of the formed polymer shell (whereas end-group functionality tends to dominate the behavior of monomers). The polymer shell may comprise, among other things, linear carbon chains, phenolic constructs; urethanes; poly(ethylene glycol) (PEG); ester and ether segments; and organohalogens. The properties of the polymer shell therefore can be tuned to control the strong mineral acid solution release profile, impart strength to the shell and mobility of the capsule.

To encapsulate the strong mineral acid solution into a polymer shell, the monomer used to form the polymer shell has hydrophobicity. This permits a monomer solution layer to form on top of a core of strong mineral acid solution and encapsulate it upon polymerization. If the monomer solution is insufficiently hydrophobic, the monomer may begin to incorporate into the strong mineral acid solution and not fully form an encapsulating layer. Also, the monomer during the double-emulsion may also be partially removed upon application of the second aqueous solution (the continuous phase). The hydrophobicity of the monomer solution also permits the monomer before polymerization initiation to distribute itself more evenly around the surrounded core of strong mineral acid solution, forming a more spherical capsule.

In an embodiment of the capsule, the polymer shell is the resultant of free-radical chain polymerization reaction. The strong mineral acid solution does not complicate or interfere with the mechanism of free-radical chain polymerization between monomer molecules. Other polymerization methods that are not interfered with by the presence of the strong mineral acid solution are also available for forming the polymer shell.

In some embodiments of the capsule, the polymerized shell has a glass transition temperature ($T_g$) and the $T_g$ is in a range of from 43° C. to 151° C. In some embodiments of the capsule, the polymerized shell does not have a glass transition temperature ($T_g$).

Certain polymerization methods do not appear to work in the presence of the strong mineral acid solution. Step growth polymerization, such as used by monomers with epoxy functional end groups to form epoxy-based polymers, does not appear to provide the polymerization mechanism that tolerates the strong mineral acid solution contacting the hydrophobic monomer solution layer. Epoxy functional end group monomers typically undergo step-growth polymerization in forming their associated polymer. In an embodiment of the capsule, the monomer does not have epoxy functional end groups. Because of the presence of a strong mineral acid that the monomer solution layer directly contacts during formation, a monomer that is susceptible to initiation of the polymerization reaction by proton-donation (that is, acid catalysis) at the mixing condition where the strong mineral acid solution and the monomer solution are first emulsified would prove highly ineffective in forming capsules. The monomer would immediately react upon contact with the strong mineral acid and would not form the polymer shell; rather, loose and distributed polymers and oligomers would randomly form as the monomer solution interacts with the surface of the strong mineral acid solution. As well, a monomer material that happens to react with the strong mineral acid solution and form a salt complex would also be an ineffective material.

FIG. 2

Figure 2:
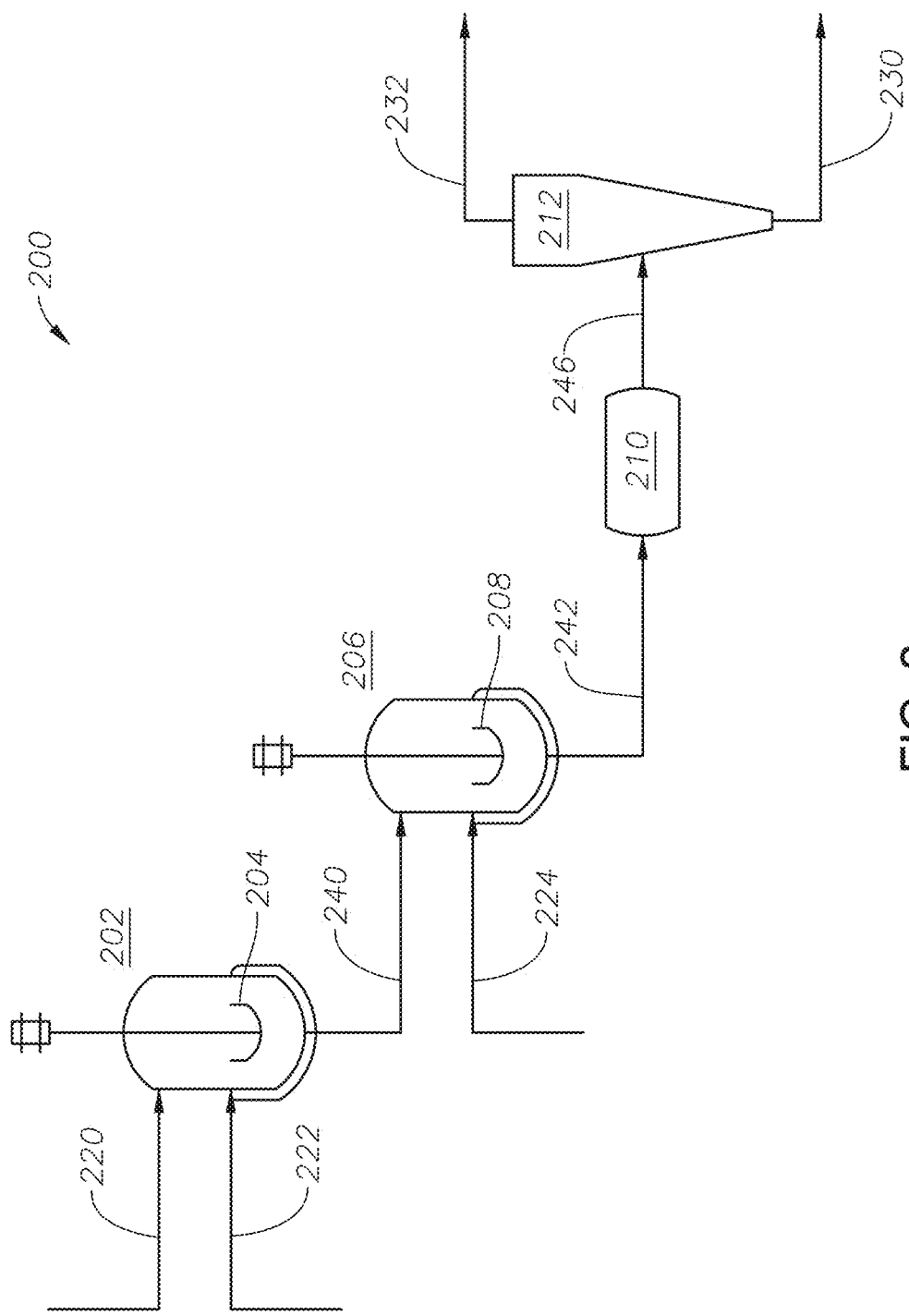
FIG. 2 is a process flow diagram of an embodiment of a system for continuously performing an embodiment of the water-in-oil-in-water (W/O/W) double-emulsion process to form the product capsules.

FIG. 2 is a process flow diagram of an embodiment of a system for continuously performing an embodiment of the water-in-oil-in-water (W/O/W) double emulsion process to form the product capsules. System 200 includes first mixer 202 with mixing apparatus 204 for forming a water-in-oil emulsion (W/O), second mixer 206 with mixing apparatus 208 for forming a W/O/W emulsion using the W/O emulsion from first mixer 202, polymerization initiator 210 and solids/liquids separator 212.

Feeds to system 200 include acid feed line 220, which introduces the strong mineral acid solution into first mixer 202, monomer feed line 222, which introduces the monomer that is associated with the polymer shell that encapsulates the strong mineral acid solution, and water feed line 224, which introduces the secondary aqueous solution that forms the exterior emulsification agent for the W/O/W double emulsion.

Products from system 200 include the polymer-encapsulated mineral acid solution, which are produced through product line 230 as a dispersion or slurry of solid capsules in a portion of post-activated W/O/W double emulsion fluid. Waste fluid line 232 conveys from solids/liquids separator 212 the remaining post-activated W/O/W double emulsion fluid, which includes unused aqueous fluids, including strong mineral acid solution, unreacted monomer and associated polymers and oligomers of the monomer.

The strong mineral acid solution is introduced into first mixer 202 through acid feed line 220. The strong mineral acid solution comprises a strong mineral acid. In an embodiment of the method, the strong mineral acid is selected from the group consisting of hydrochloric acid (HCl), hydrofluoric acid (HF), sulfuric acid ($H_2SO_4$), nitric acid ($HNO_3$) and combinations thereof. The strong mineral acid solution is the discontinuous or minority phase of the primary emulsification that occurs in first mixer 202 that forms the core material of the product polymer-encapsulated mineral acid solution. In an embodiment of the method, the strong mineral acid solution further comprises a free-radical initiator.

The monomer solution is introduced into first mixer 202 through monomer feed line 222. The monomer used is a liquid hydrophobic monomer before it is polymerized into the polymer shell. In an embodiment of the method, the monomer solution comprises a monomer having acrylate end group functionality. In an embodiment of the method, the monomer solution comprises a monomer having methacrylate end group functionality. The monomer solution dissolves and contains other components useful for polymerizing the monomer as well as balancing properties of the monomer solution. In such embodiments, the monomer solution may further comprise a hydrocarbon, including a hydrocarbon fraction such as diesel, or a refined or purified hydrocarbon, such as benzene and the xylenes. In an embodiment of the method, the monomer solution further comprises a free-radical initiator. Several known radical initiators are soluble in the hydrocarbon or monomer phase and not soluble in an aqueous or water phase. In an embodiment of the method, the monomer solution further comprises a second monomer. The monomer solution is the continuous or majority phase of the primary emulsification that occurs in first mixer 202 that forms the polymer shell of the product polymer-encapsulated mineral acid solution.

When emulsifying the primary emulsion into a secondary emulsion, there is a concern regarding the sheer force applied to the second interior phase (the monomer solution) while it is interacting with the continuous phase. There is also a concern regarding the application of momentum to the W/O combination. If both fluids of the primary emulsion has different densities, the application of force to the W/O emulsion within a second continuous fluid will give the first aqueous phase and the oil phase different moments of momentum. During prolonged emulsification, eventually the differences in density can cause the components of the primary emulsion to physically pull apart separate. Given that the polymer shell has not formed, there is no barrier other than the repulsion to the hydrophobic monomer that surrounds the strong mineral acid solution unless another material, including a hydrocarbon fluid, is incorporated into the monomer solution. The density of the monomer solution can be raised by adding a solvent or a co-monomer, including 1,6-hexanediol diacrylate. The density and viscosity of the strong mineral acid solution can be elevated by adding thickening agents that are also weighting agents, including polyvinyl alcohol (PVA). In an embodiment of the method, the monomer solution has a density that is not substantially different than the density of the strong mineral acid solution. In an embodiment of the method, the difference is not significant. In an embodiment of the method, the monomer solution has a viscosity that is not substantially different than the viscosity of the strong mineral acid solution.

In first mixer 202 the introduced strong mineral acid solution is emulsified into the monomer solution using mixing apparatus 204, forming the water-in-oil (W/O) emulsion. System 200 passes the W/O emulsion from first mixer 202 using second reactor feed line 240.

The secondary aqueous solution is introduced into second mixer 202 through water feed line 220. The secondary aqueous solution is the continuous or majority phase of the secondary emulsification that occurs in second mixer 206. The secondary aqueous solution causes the hydrophobic monomer solution of the oil phase of the W/O emulsion to be trapped between two layers of aqueous fluid: the strong mineral acid solution and the secondary aqueous solution. In an embodiment of the method, the secondary aqueous solution further comprises a free-radical initiator.

In second mixer 206 the introduced W/O emulsion is further emulsified into the secondary aqueous solution using mixing apparatus 208, forming the water-in-oil-in-water (W/O/W) emulsion. System 200 passes the W/O/W double emulsion from second mixer 206 using polymerization initiator feed line 242.

With greater concentrations of mineral acid used in forming the core of the polymer-encapsulated mineral acid solution (and in the internal water phase) and the monomer solution phase forming a semi-permeable barrier, osmotic pressure can build between the two water phases (the internal water phase and the continuous water phase) such that water from the continuous phase attempts to communicate with and dilute the internal phase through the monomer solution phase. Because of its hydrophobic nature and the monomer has not formed the polymer shell at this point of the process, the monomer solution phase can act as a semi-permeable membrane to the two aqueous phases. If the osmotic pressure is high enough, the water from the continuous phase can push into the monomer solution phase flow into the aqueous interior phase. Adjusting the composition of the secondary aqueous solution such that the osmotic pressure is diffused can prevent osmosis from occurring can preserve the integrity of the hydrophobic monomer solution and the efficacy of the internal water phase. An acid may be used to adjust the secondary aqueous solution composition. In an embodiment of the method, the secondary aqueous solution further comprises an acid. In an embodiment of the method, the acid dissociates a chlorine anion. In such embodiments, the acid is hydrochloric acid (HCl). In such embodiments, the concentration of hydrochloric acid in the secondary aqueous solution is in a range of from about 1 wt. % to 20 wt. % of the solution. The two aqueous water phases do not have to have equal concentrations of ions to off-set one another. The two aqueous water phases can remain imbalanced through the process such that that the osmotic pressure of the continuous water phase cannot overcome the monomer solution phase. In an embodiment of the method, the secondary aqueous solution has a negative ion concentration that is not substantially different than the negative ion concentration of the strong mineral acid solution. In an embodiment of the method, the difference is not significant. In an embodiment of the method, the concentrations are equal. A salt may also be used to adjust the secondary aqueous solution composition. In an embodiment of the method, the secondary aqueous solution further comprises a salt. In an embodiment of the method, the secondary aqueous solution further comprises a salt that dissociates a chlorine anion. In such an embodiment, the salt is sodium chloride (NaCl). In an embodiment of the method, the secondary aqueous solution has a negative anion concentration that is not substantially different than the negative ion concentration of the strong mineral acid solution. In an embodiment of the method, the difference is not significant. In an embodiment of the method, the concentrations are equal.

The W/O/W double emulsion passing from second mixer 202 is still an emulsion of three separate liquids. The hydrophobic monomer solution in the "oil" phase has not been cured. System 200 passes the W/O/W double emulsion product from second mixer 206 via polymerization initiator feed line 242 to polymerization initiator 210. Polymerization initiator 210 is operable to initiate a free-radical chain polymerization in the monomer solution of each W/O/W emulsion by converting the free-radical initiator into free radicals, which initiate the radical polymerization reaction of the monomer of the monomer solution phase. The monomer reacts and forms a solid polymer layer where the monomer solution is present.

The cure rate within the polymerization initiator and the conversion of the free-radical initiator is such that the monomer solution phase surrounding the strong mineral acid solution phase forms the polymer shell that encapsulates the strong mineral acid solution. The cure rate of the polymer is such that the polymer shell develops a thickness measured radially from the interior surface to the exterior surface of the polymer-encapsulated mineral acid solution. The solid near-spherical or spherical polymer layer is the polymer shell that encapsulates the strong mineral acid solution.

In an embodiment of the method, converting the free-radical initiator in the monomer solution occurs by introducing electromagnetic energy into the secondary emulsion. In such embodiments, the free-radical initiator is operable to form free radical species upon adsorbing introduced electromagnetic energy. Polymerization initiator is operable to introduce the electromagnetic energy into the W/O/W double emulsion. Introduced electromagnetic energy can include infra-red (IR) waves, visible light, including natural, filtered, polarized and artificial light, ultraviolet light, X-rays, gamma rays, radio waves and microwaves. In an embodiment of the method, the free-radical initiator is a photo-initiator. Ultraviolet (UV) light is typically used to break apart the free-radical initiators. 2,2'-Azobis(2-methylpropionitrile) (AIBN), 2-hydroxy-2-methylpropiophenone, diphenyl(2,4,6-trimethylbenzoyl)phosphine oxide (DPO), benzoyl peroxide (BPO) and blends thereof are well-known photo-initiator (light-activated radical generators).

In an embodiment of the method, converting the free-radical initiator in the monomer solution occurs by introducing heat into the secondary emulsion. In such embodiments, the free-radical initiator is operable to form free radical species upon raising the temperature to a temperature specific to the initiator. The polymerization initiator introducing heat can indirectly convey heat to the W/O/W double emulsion, such as through a heat exchanger, or directly by introducing a stream to incorporate with the double emulsion and directly convey heat into it. Di-tert-butyl peroxide (DTBP), which has low solubility in water, is known as an initiator that breaks down at elevated temperatures. AIBN and BPO are also have low solubility in water and are thermal initiators.

Upon polymerization of the monomer and formation of the polymer-encapsulated mineral acid solution, the W/O/W double emulsion composition is converted into the post-activated W/O/W double emulsion fluid, which is effectively a raw product. The post-activated W/O/W double emulsion fluid contains the product capsules, unused aqueous fluids, including strong mineral acid solution, unreacted monomer and associated polymers and oligomers of the monomer. System 200 passes the raw product stream through separator feed line 246 into solids/liquids separator 212. Solids/liquids separator is operable to separate the solids, including heavy oligomers, unsuspended polymers and the product polymer-encapsulated mineral acid solution from the liquids, including unreacted monomer, oligomers, suspended polymers and aqueous solution, of the introduced post-activated W/O/W double emulsion fluid.

Experiments

Examples of specific embodiments facilitate a better understanding of the formation and use of polymer-encapsulated mineral acid solution. In no way should the Examples limit or define the scope of the invention.

Characterization of Shell Stability—Acrylate Polymers

Several acrylate and methacrylate-based polymers are examined for understanding their basic properties and how they may be applicable for downhole service in an elevated temperature/brine/acid environment.

Several homopolymers are made from the following monomers: diurethane dimethacrylate; ethoxylated trimethyolpropane triacrylate; Bisphenol-A glycerolate dimethacrylate; 1,6-hexanediol diacrylate (Polysciences #23671-100) (Polysciences, Inc.; Warrington, Pa.); and SATOMER urethane acrylate oligomer (CN9013). Diurethane dimethacrylate includes a mixture of isomer monomers where the diurethane has a hydrogen:methane ratio of about 1:1 (Sigma-Aldrich #436909) (Sigma-Aldrich Corp.: St. Louis, Mo.). In addition, a copolymer is made: 2-hydroxylethyl acrylate/2,2-Bis[4-(2-acryloxyethoxy)phenyl] propane. The polymerization reaction was initiated using UV light with 2 wt. % of 2-hydroxy-2-methylpropiophenone, which is a photo-initiator.

The resultant polymers are each examined using a dynamic mechanical analysis (DMA) testing machine and a thermogravimetric analysis (TGA) analyzer. The DMA testing provides information regarding glass temperature transition ($T_g$), which is the temperature where the polymer transitions from a hard, brittle state to a rubbery, elastomeric state. It also provides information on the modulus of the polymer, which is the tendency to deform under a constant applied force. TGA testing provides the thermal stability of the tested material, including providing a decomposition temperature ($T_d$).

Figure 3:
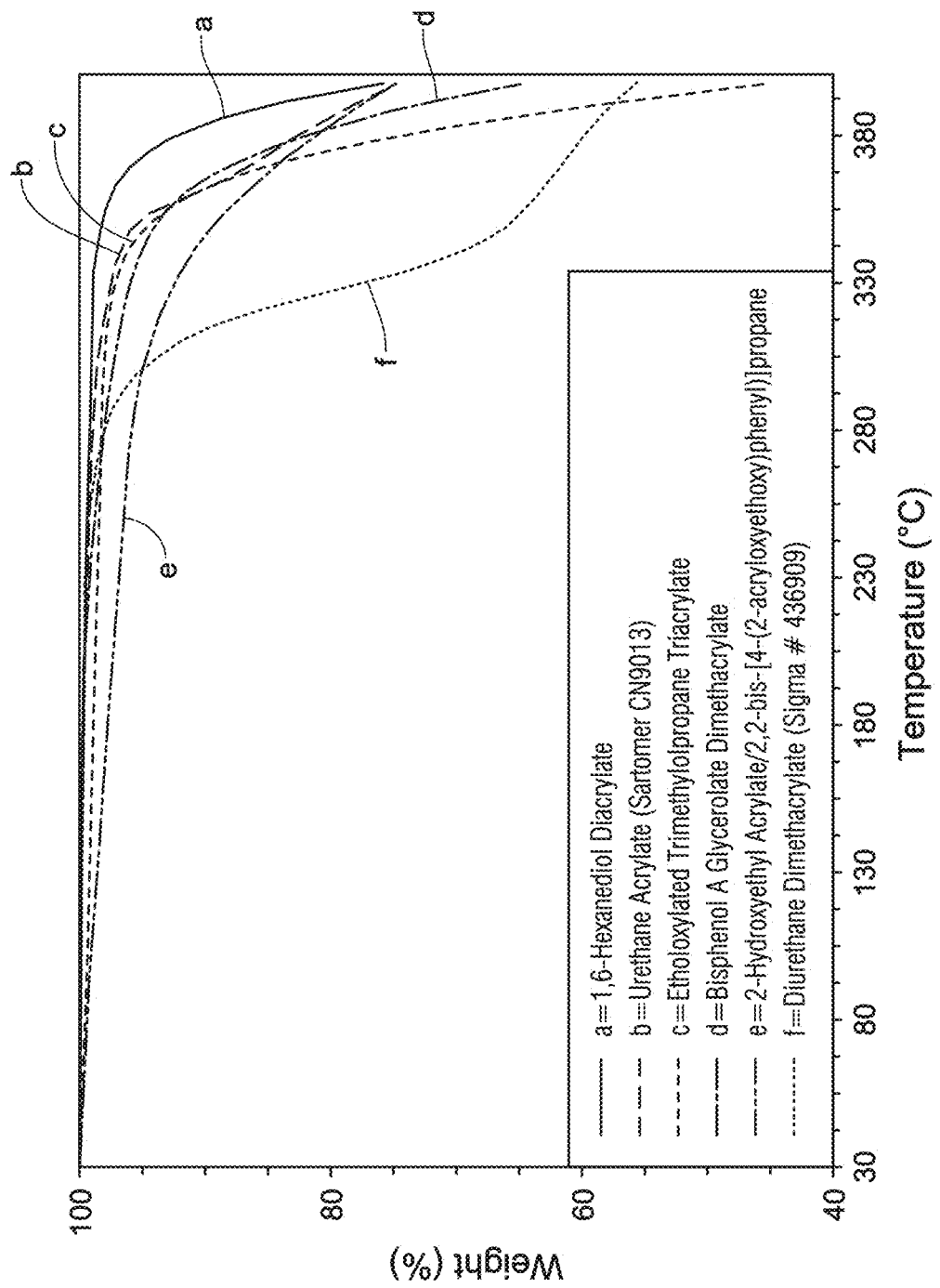
FIG. 3 is a graph showing traces for mass versus temperature of the several acrylate polymers.

FIG. 3 is a graph showing traces for TGA (mass versus temperature) of the several acrylate polymers. Table 1 shows the determined $T_d$ in ° C. for the several acrylate polymers.

TABLE 1

Onset of decomposition ($T_d$) for several acrylate polymers.

| Acrylate System | $T_d$ (° C.) |
|---|---|
| diurethane dimethacrylate | 305 |
| ethoxylated trimethyolpropane triacrylate | 370 |
| Bisphenol-A glycerolate dimethacrylate | 367 |
| 1,6-hexanediol diacrylate | 380 |
| 2-hydroxylethyl acrylate/2,2-Bis[4-(2-acryloxyethoxy)phenyl] propane | 337 |
| urethane acrylate oligomer (SATOMER CN9013) | 344 |

Figure 4:
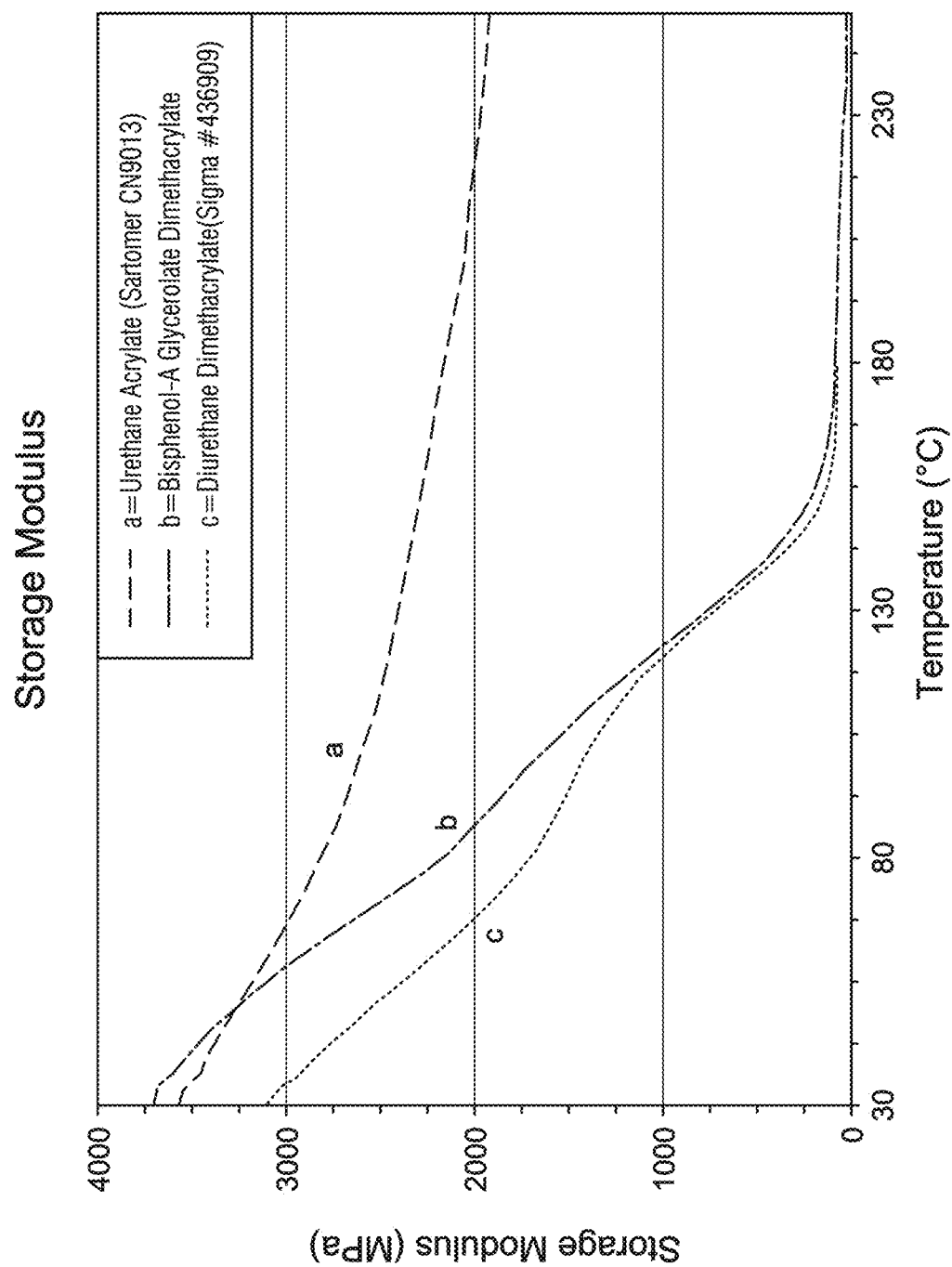
FIG. 4 is a graph showing traces for storage modulus of the several acrylate polymers.
Figure 5:
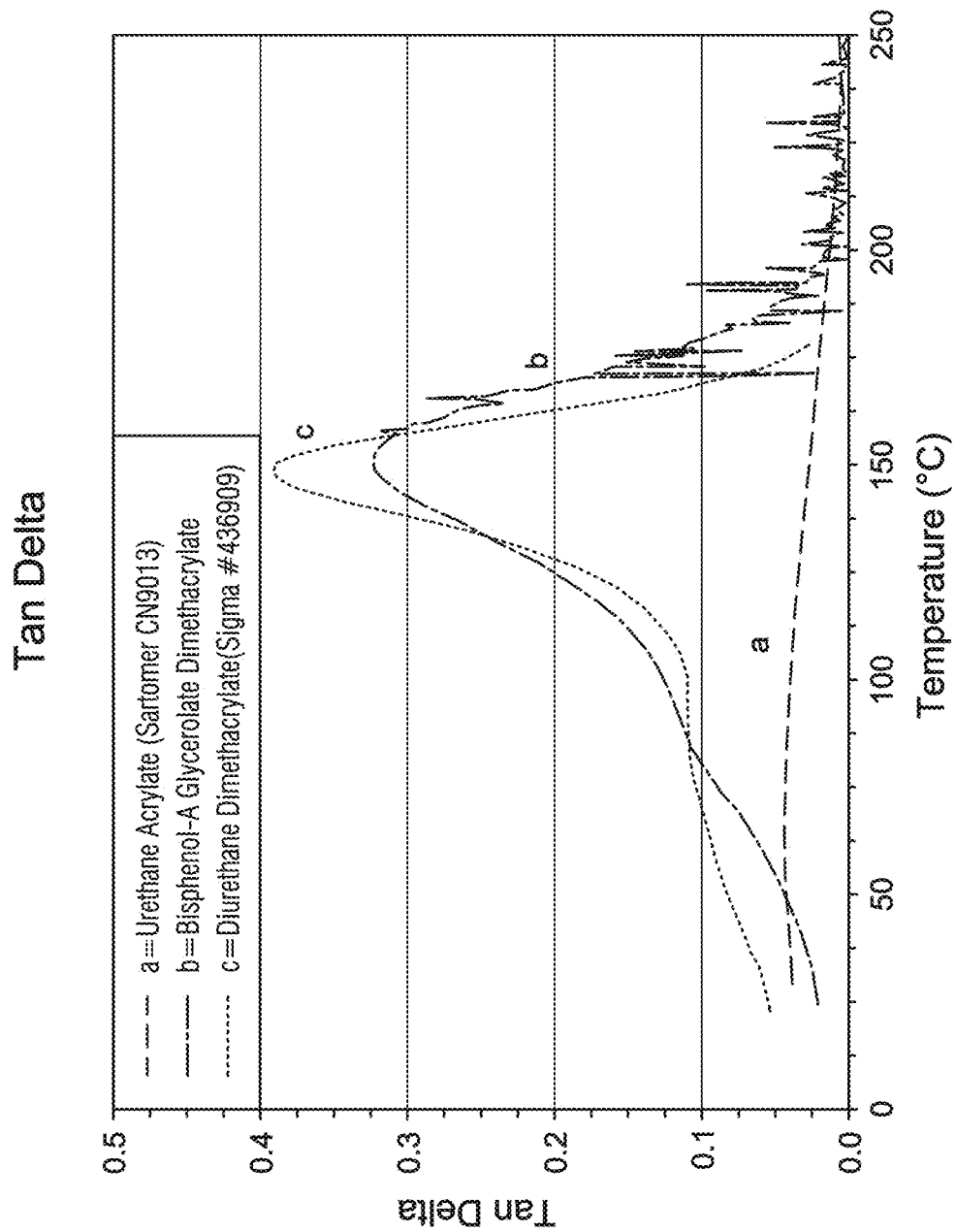
FIG. 5 is a graph showing traces for tan delta of the several acrylate polymers.

FIG. 4 is a graph showing traces for storage modulus (DMA) of the several acrylate polymers. FIG. 5 is a graph showing traces for tan delta (DMA) of the several acrylate polymers. Table 2 shows the determined glass transition temperature ($T_g$) and storage modulus at 35° C. for each of the several acrylate polymers.

TABLE 2

Glass transition temperatures ($T_g$) and storage modulus for several acrylate polymers.

| Acrylate System | $T_g$ (° C.) | Storage Modulus at 35° C. (MPa) |
| --- | --- | --- |
| urethane acrylate oligomer (SARTOMER CN9013) | — | 3483 |
| Bisphenol-A glycerolate Dimethcryalte | 151 | 3617 |
| diurethane dimethacrylate (Sigma #436909) | 149 | 2971 |

All of the acrylate polymers show high stability by having a greater than 300° C. temperature of degradation, glass transition temperatures well above 100° C. and storage modulus greater than about 2900 MPa.

Figure 6:
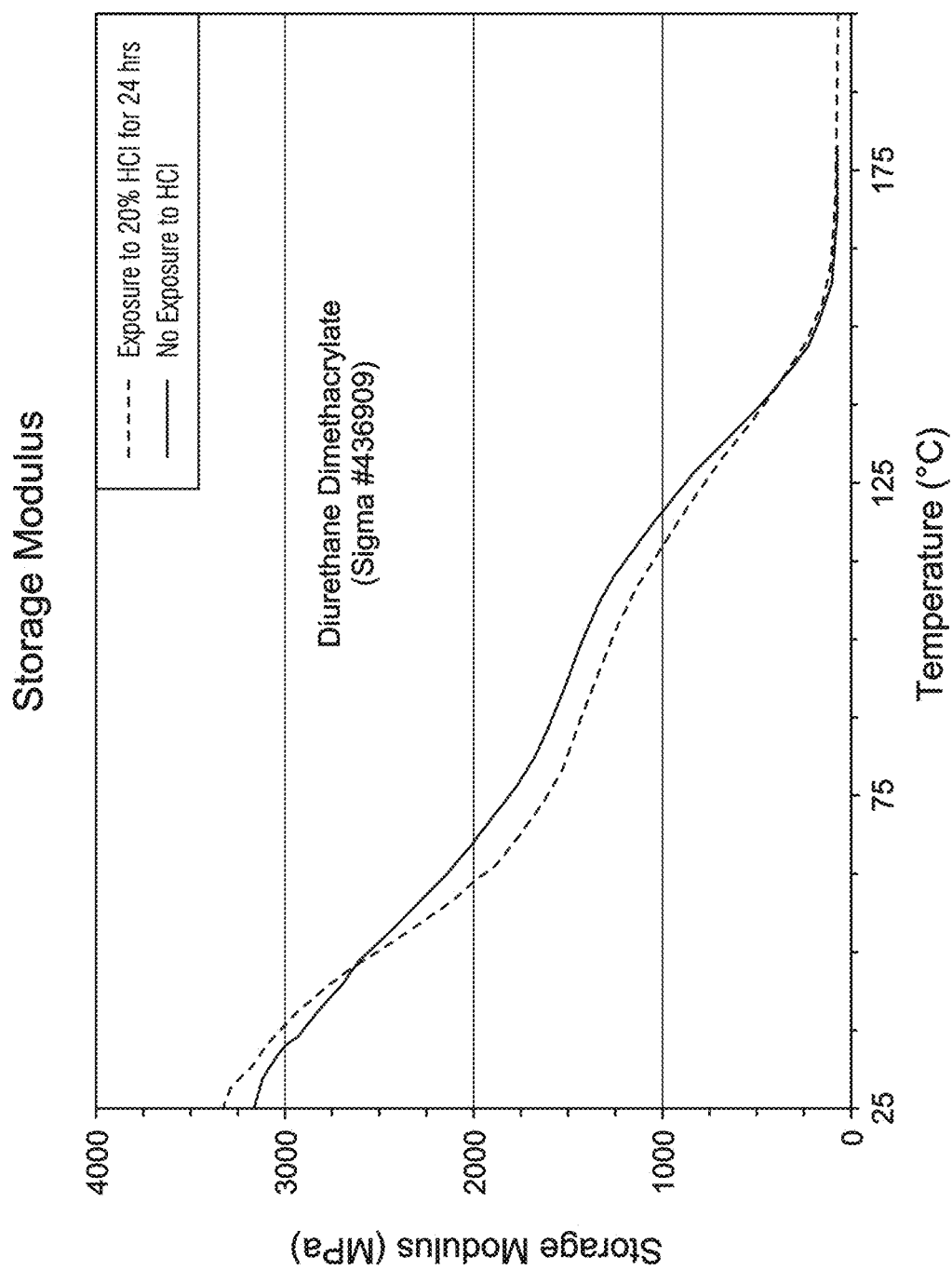
FIG. 6 is a graph showing traces for storage modulus of diurethane dimethacrylate polymer after no immersion and 24 hours of immersion in a 20 wt. % HCl solution.
Figure 7:
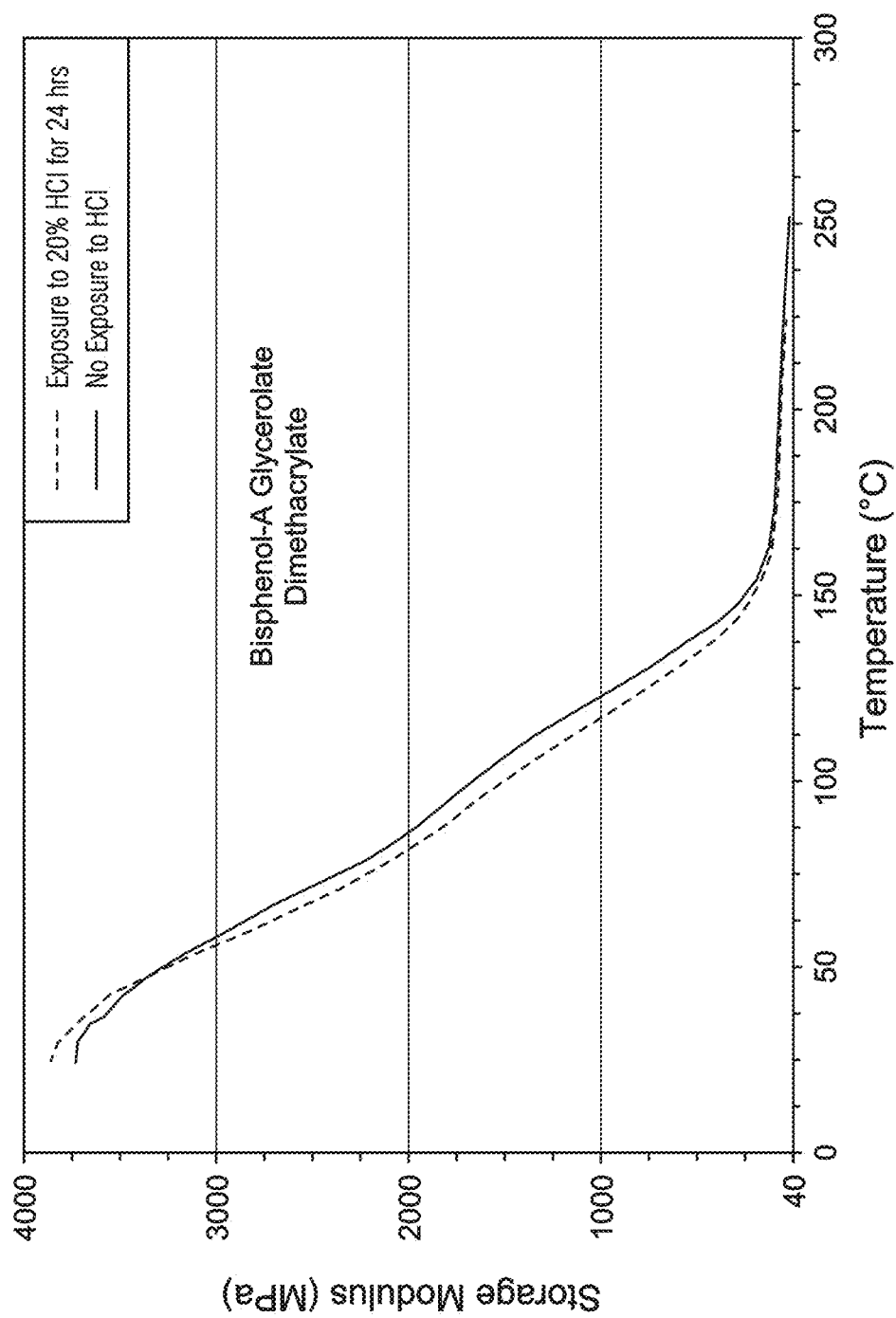
FIG. 7 is a graph showing traces for tan delta of Bisphenol-A glycerolate methacrylate polymer after no immersion and 24 hours of immersion in a 20 wt. % HCl solution.

The three polymers shown in Table 3 are immersed in a 20 wt. % HCl aqueous solution for 24 hours and then retested for storage modulus and tan delta to determine if there is any modification to the polymer after a meaningful period of exposure. FIG. 6 is a graph showing traces for storage modulus of diurethane dimethacrylate polymer after no exposure and 24 hour exposure to a 20 wt. % HCl solution. FIG. 7 is a graph showing traces for tan delta of Bisphenol-A glycerolate methacryalte polymer after no exposure and 24 hour exposure to a 20 wt. % HCl solution. Table 3 shows the comparative storage modulus and tan delta results with no and 24 hour exposure.

TABLE 3

Mechanical properties with and without exposure to 20% HCl.

| | Storage Modulus at 35° C. (MPa) | | $T_g$ (° C.) | |
| --- | --- | --- | --- | --- |
| Acrylate System | No HCl Immersion | Immersion in 20% HCl for 24 hours | No HCl Immersion | Immersion in 20% HCl for 24 hours |
| Diurethane Dimethacrylate (Sigma #436909) | 2971 | 3087 | 149 | 150 |
| Bisphenol-A Glycerolate Methacryalte | 3617 | 3697 | 151 | 148 |
| Urethane Acrylate (Sartomer CN9013) | 3483 | 3393 | — | — |

The mechanical properties of the three acrylate polymers based upon FIGS. 6 and 7 and Table 3 do not appear to have been impacted in any manner by the exposure to 20 wt. % HCl aqueous solution. This suggests that the polymers are suitable and stable for storing HCl aqueous solution if encapsulated.

Figure 8:
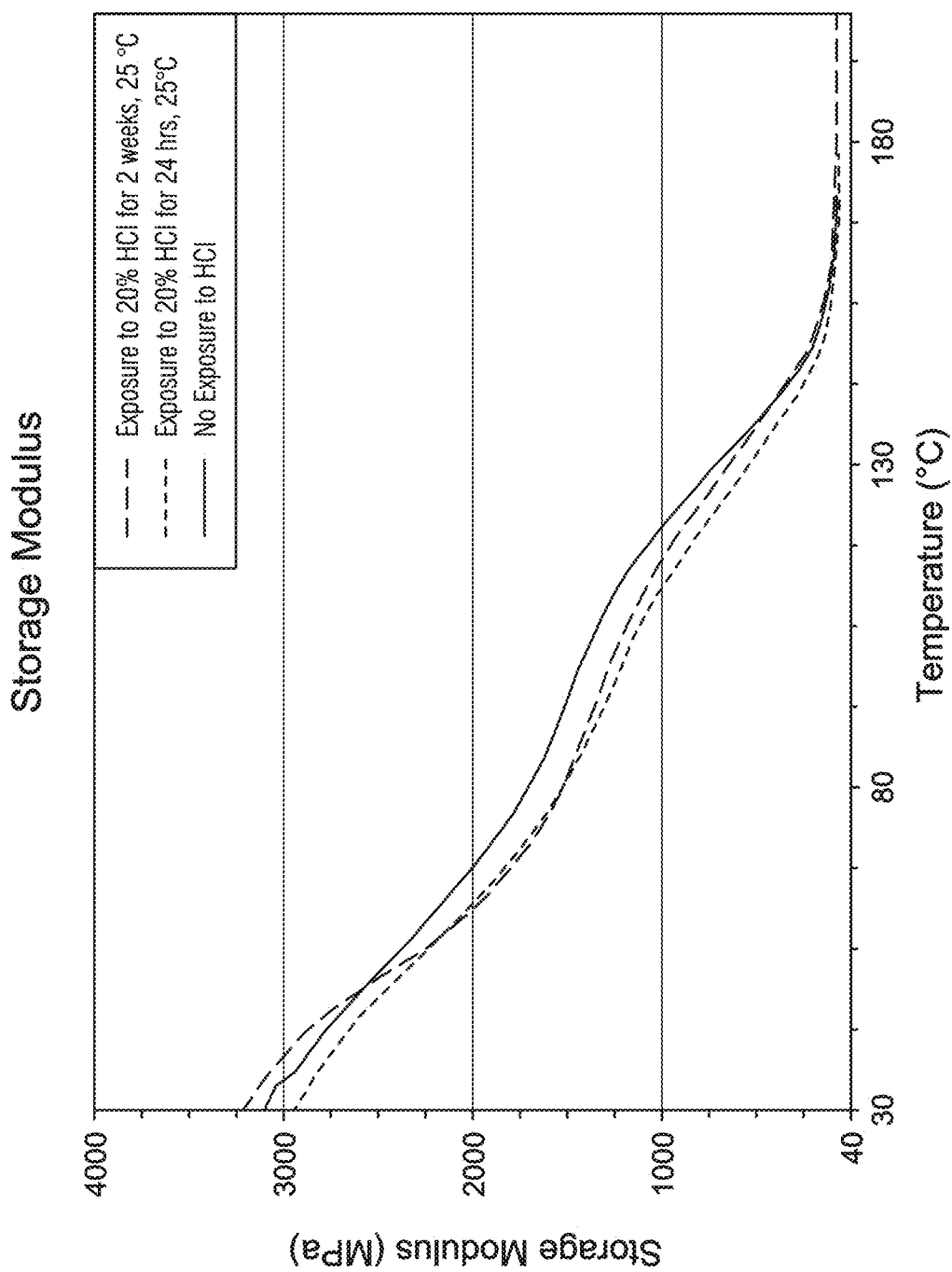
FIG. 8 is a graph showing traces for determined storage modulus of diurethane dimethacrylate after no immersion, 24 hours of immersion and 2 weeks of immersion in a 20 wt. % HCl solution.
Figure 9:
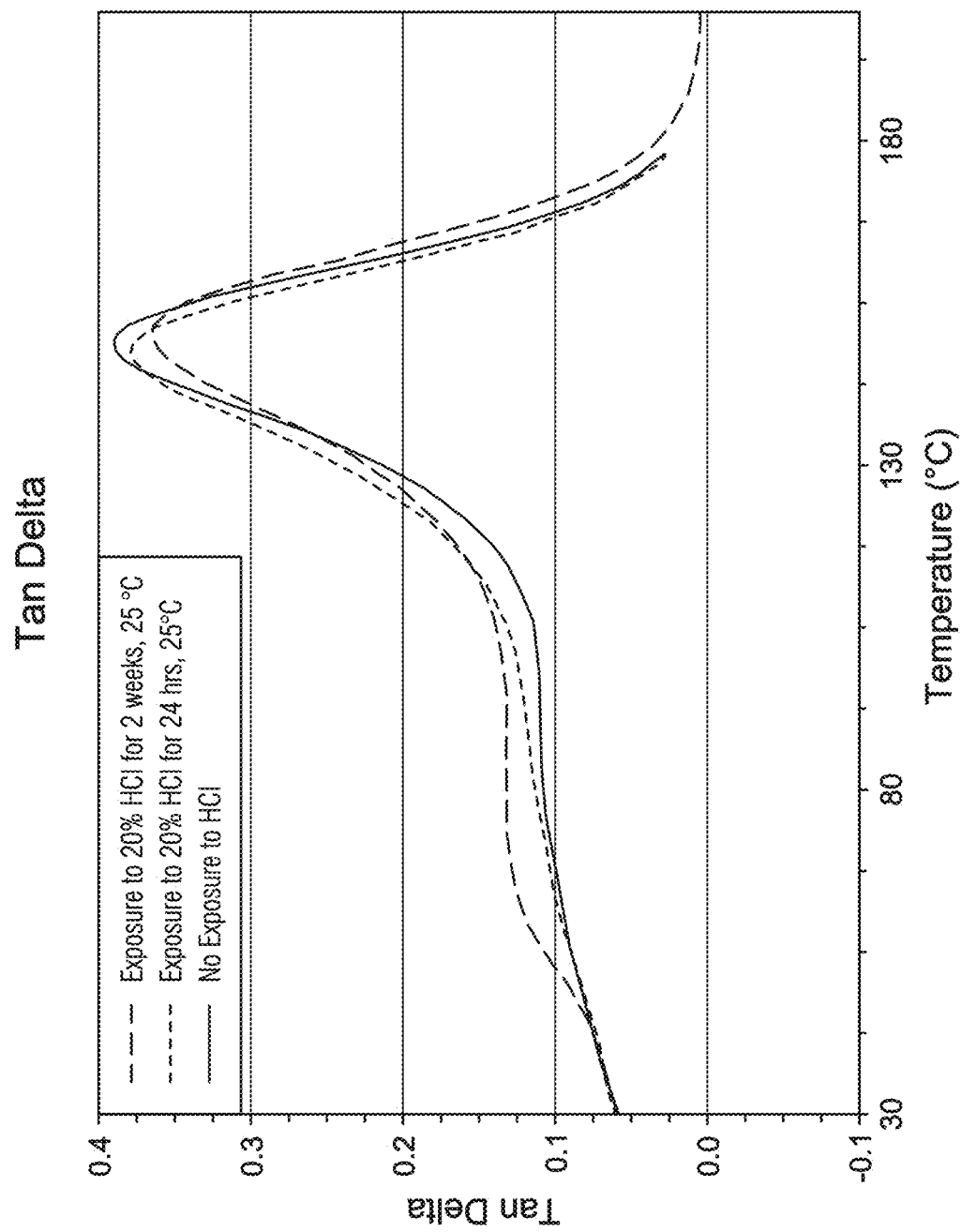
FIG. 9 is a graph showing traces for determined tan delta of diurethane dimethacrylate after no immersion, 24 hours of immersion and 2 weeks of immersion in a 20 wt. % HCl solution.

The diurethane dimethacrylate polymer is tested using DMA for storage modulus and tan delta after no immersion, 24 hours of immersion and 2 weeks of immersion in a 20 wt. % HCl aqueous solution at 25° C. to examiner long-term exposure effects to aqueous 20 wt. % HCl solution. FIG. 8 is a graph showing traces for determined storage modulus of diurethane dimethacrylate after no immersion, 24 hours of immersion and 2 weeks of immersion in a 20 wt. % HCl solution. FIG. 9 is a graph showing traces for determined tan delta of diurethane dimethacrylate after no immersion, 24 hours of immersion and 2 weeks of immersion in a 20 wt. % HCl solution. The mechanical properties of the acrylate polymer based upon FIGS. 8 and 9 do not appear to have been impacted in any manner by the exposure to 20 wt. % HCl aqueous solution even up to 2 weeks of exposure. This suggests that the polymers are suitable and stable for storing HCl aqueous solution if encapsulated. After two weeks of acid solution exposure, only a ~0.5 wt. % gain was detected suggesting minimal penetration and swelling of the polymeric material.

Encapsulation of Acid Solution using Double Emulsion Polymerization

A double emulsion polymerization technique is used to prepare polymer-encapsulated mineral acid solution (a polymerized shell encapsulating an aqueous HCl in the core of the capsule).

A urethane acrylate monomer (SARTOMER CN9013) is used to form the polymer shell. A double emulsion (water-in-oil-in-water emulsion) polymerization is used with the monomer solution as the "oil" phase to form the liquid core/polymer shell capsules. Two solutions are prepared for the first emulsion. The first solution is an organic solution containing SARTOMER CN9013 as the monomer, chloroform, a lipophilic surfactant (Span® 80) (Sigma-Aldrich #85548) and an initiator. For the 10 wt. % HCl core solution, 1 wt. % of AIBN (Sigma-Aldrich #441090) is used as a thermal initiator. At 20 wt. % and 30 wt. % HCl core solution, a blend of DPO and 2-hydroxyl-2-methlypropiophenone is used as a photo-initiator. For preparation of organic solution, the urethane acrylate is dissolved into chloroform by mixing and applying low heat. The ratio of chloroform:CN9013 is in a range of about 2:1 to about 1:1 by weight. SPAN 80 is introduced into the composition in a range of from about 1 wt. % to about 5 wt. % on a monomer solution basis. Once the monomer is dissolved into the organic solution and cooled, the initiator is added to prevent premature polymerization. The initiator is introduced in a range of from about 1 wt. % to about 3 wt. % on a monomer solution basis.

The second solution is a strong mineral acid solution containing deionized water, a surfactant mixture (TWEEN® 80/Pluronic® F-127) and hydrochloric acid (HCl). TWEEN 80 (#P4780) and PLURONIC F-127 (#P2443) are both available from Sigma-Aldrich. The inner solution mainly comprises deionized water that is mixed with 37 wt. % aqueous HCl. Optionally, polyvinyl alcohol (PVA) is introduced to the strong mineral acid solution to balance density with the monomer solution and to thicken the viscosity of the strong mineral acid solution. The amount, when added, is up to about 1 wt. % of the solution. The PVA has an average molecular weight ($M_w$) of 146,000-186,000 and is 87-89% hydrolyzed. A mixture of TWEEN 80/PLURONIC F-127 is the surfactant package for the strong acid aqueous solution. TWEEN 80 is typically provided at about 1 wt. % of the deionized water, and PLURONIC F-127 is introduced at about 0.2 wt. % of the solution. The resulting composition contains HCl in a range of from about 10 wt. % to about 30 wt. % of the solution.

The second aqueous solution, which is the continuous phase of the secondary emulsion, contains deionized water, the surfactant mixture (TWEEN 80/PLURONIC F-127) and optionally PVA. The surfactant concentration is the same as the strong mineral acid solution. When included, the PVA concentration is higher—about 2 wt. % of the solution—than the PVA concentration in the strong mineral acid solution. Optionally, the second aqueous solution includes hydrochloric acid in a range of from about 1 wt. % to about 20 wt. % of the solution.

To prepare the capsules, 1 mL of the aqueous acid solution is added to a vial containing 10 mL of the organic solution. The combination is emulsified into a primary emulsion at high RPM for two minutes, dispersing the acid aqueous solution into the oil phase. The primary emulsion (W/O) is added into the second aqueous solution. The combination of the primary emulsion and the second aqueous solution is emulsified into a secondary emulsion (W/O/W) at high RPM for two minutes, dispersing the primary emulsion into the second aqueous phase. This forms a three-phase liquid pre-capsule.

Once the W/O/W forms, the double emulsion is cured. Vigorously stirring on a hot plate is maintained for 5 minutes. For the blend of photo-initiators, the cure is conducted using an ELC-403 light curing system while preventing the pre-capsules from settling together. When using the AIBN initiator, the hot plate is maintained at 65° C. for the curing time. The cured polymer-encapsulated mineral acid solution are collected, washed, scanned and imaged.

Figures 10A, 10B:
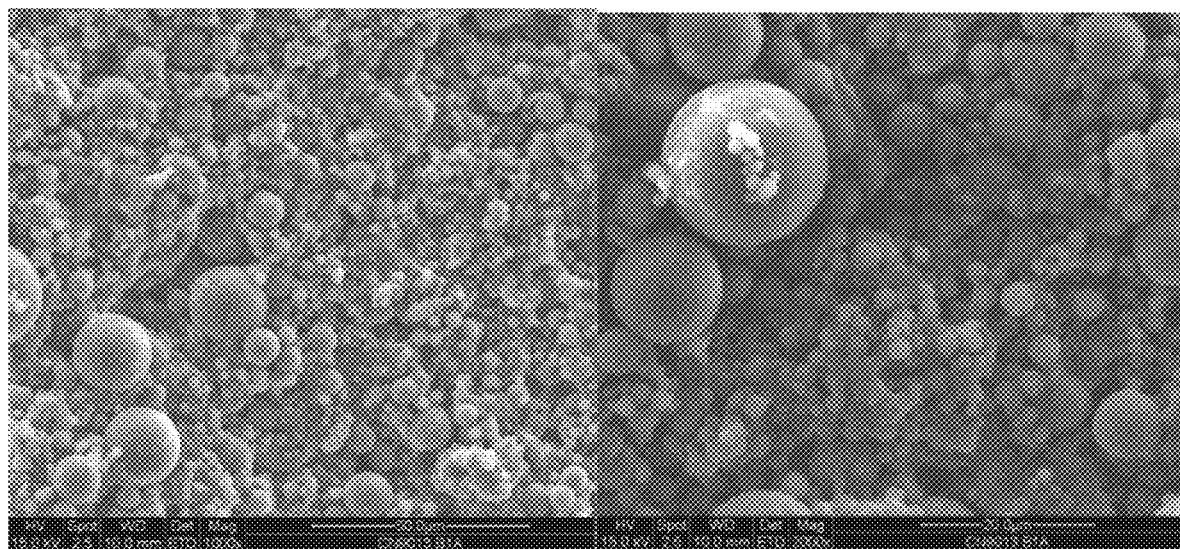
FIGS. 10A, 10B, and 10C are scanning electron micrographs (SEMs) of synthesized polymer-encapsulated mineral acid solution having 10 wt. % HCl core.
Figure 10C:
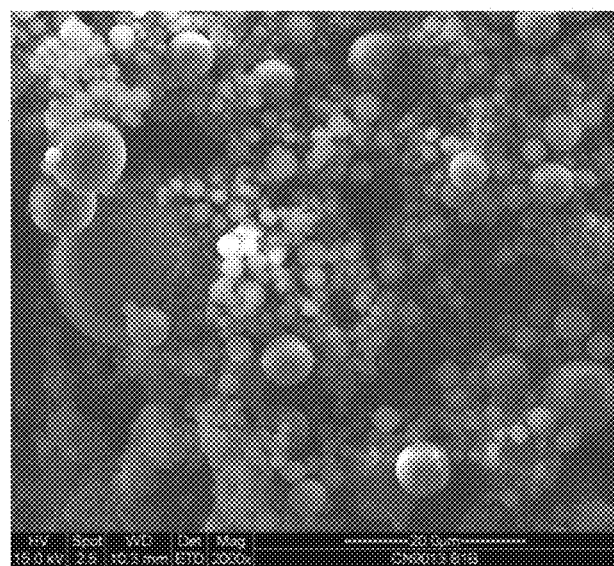

FIGS. 10A-C are scanning electron micrographs (SEMs) of synthesized polymer-encapsulated mineral acid solution having 10 wt. % HCl core. FIG. 10A is at 50 μm magnification. FIGS. 10B and 10C are at 20 μm magnification.

Figure 11A:
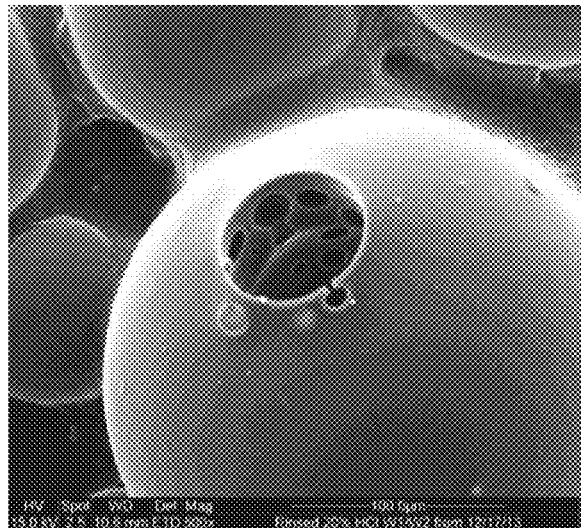
FIGS. 11A, 11B, and 11C are SEMs of synthesized polymer-encapsulated mineral acid solution having 20 wt. % HCl core.
Figure 11B:
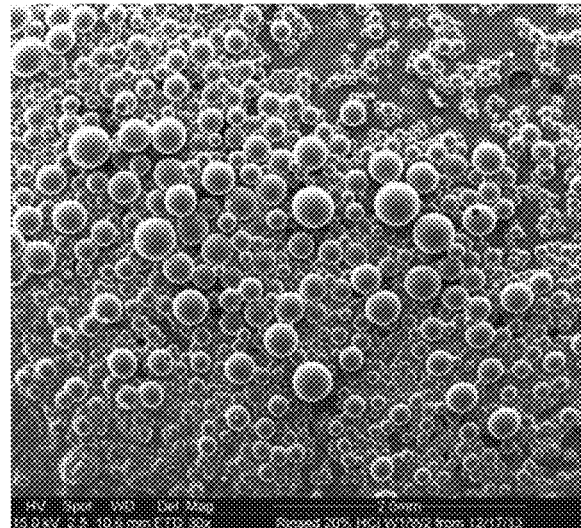
Figure 11C:
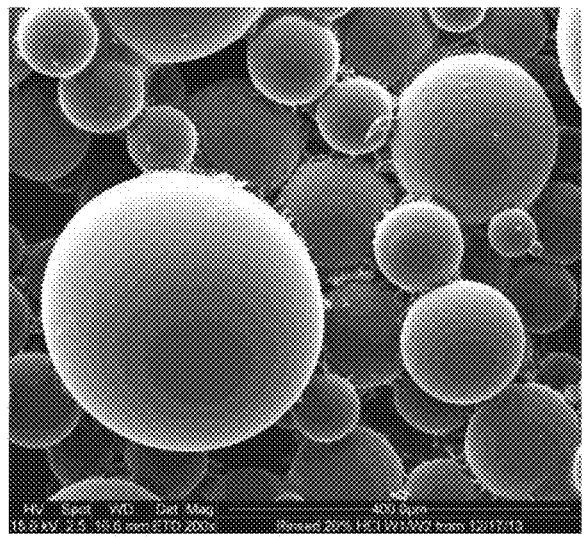
Figure 12A:
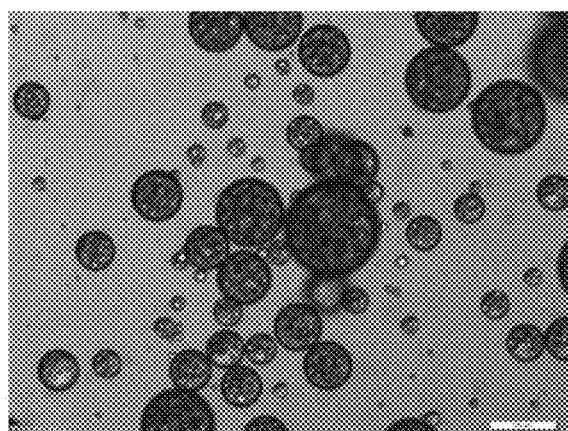
FIGS. 12A and 12B are optical microscopy images of the synthesized polymer-encapsulated mineral acid solution having 20 wt. % HCl core.
Figure 12B:
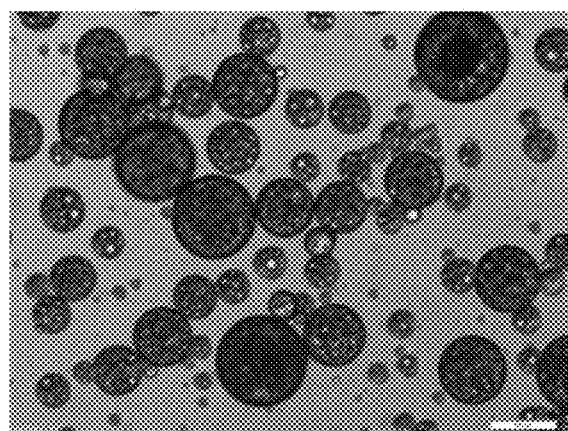

FIGS. 11A-C are scanning electron micrographs (SEMs) of synthesized polymer-encapsulated mineral acid solution having 20 wt. % HCl core. FIG. 11A is at 100 μm magnification. FIG. 11B is at 2 mm. FIG. 11C is at 400 μm. The voids in the polymer shell wall shown in FIG. 11A is believed to be pockets filled with mineral acid solution while the liquid monomer solution formed into the solid polymer shell. The polymer shell has a smooth exterior from forming contacting the second aqueous solution. FIGS. 12A-B are optical microscopy images of the synthesized polymer-encapsulated mineral acid solution having 20 wt. % hCl core. Both FIG. 12 images are at 400 μm resolution.

Figure 13A:
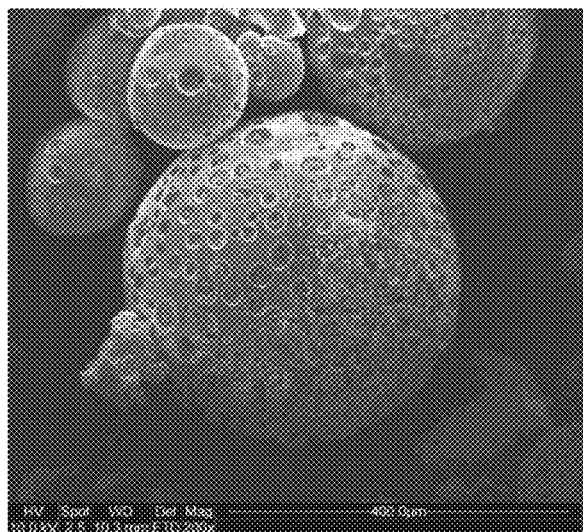
FIGS. 13A, 13B, and 13C are SEMs of synthesized polymer-encapsulated mineral acid solution having 30 wt. % HCl core.
Figure 13B:
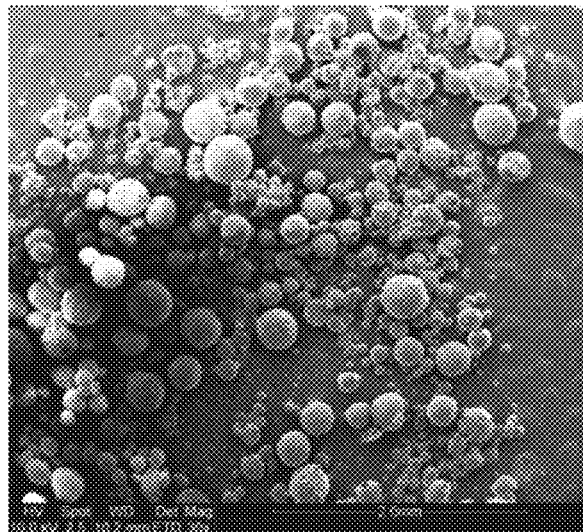
Figure 13C:
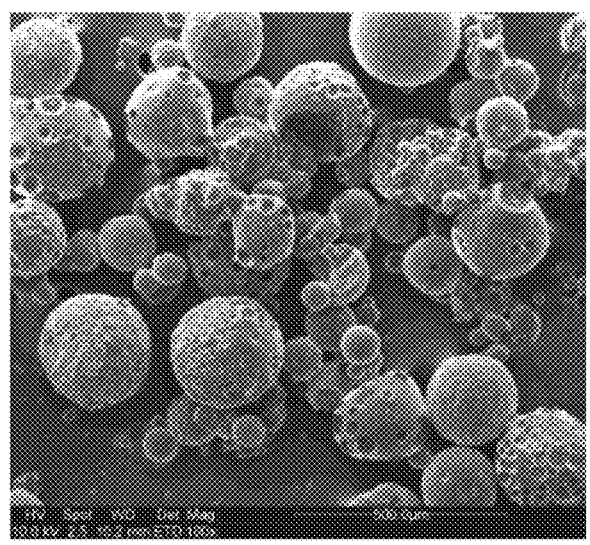
Figure 14A:
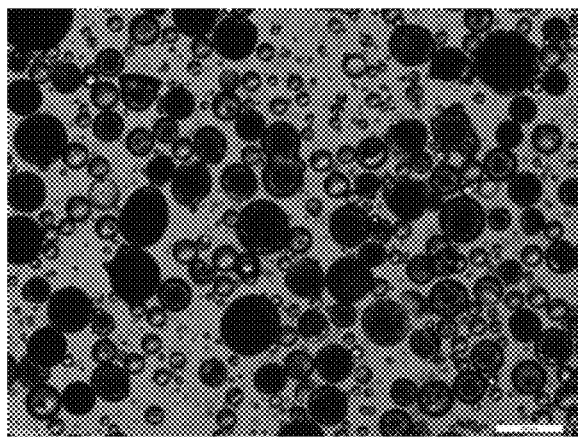
FIGS. 14A and 14B are optical microscopy images of the synthesized polymer-encapsulated mineral acid solution having 30 wt. % HCl core.
Figure 14B:
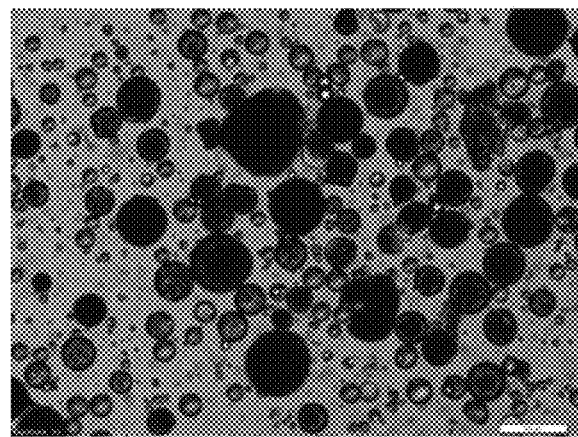

FIGS. 13A-C are scanning electron micrographs (SEMs) of synthesized polymer-encapsulated mineral acid solution having 30 wt. % HCl core. FIG. 13A is at 400 μm magnification. FIG. 13B is at 2 mm. FIG. 13C is at 500 μm. Unlike the 10 wt. % and 20 wt. % HCl capsules, the 30 wt. % HCl capsules show exterior pitting. The pitting may be caused by osmotic pressure exerted by the aqueous continuous phase. FIGS. 14A-B are optical microscopy images of the synthesized polymer-encapsulated mineral acid solution having 30 wt. % HCl core.

Effects of Brine on Polymer-Encapsulated Mineral Acid Solution

Figure 15:
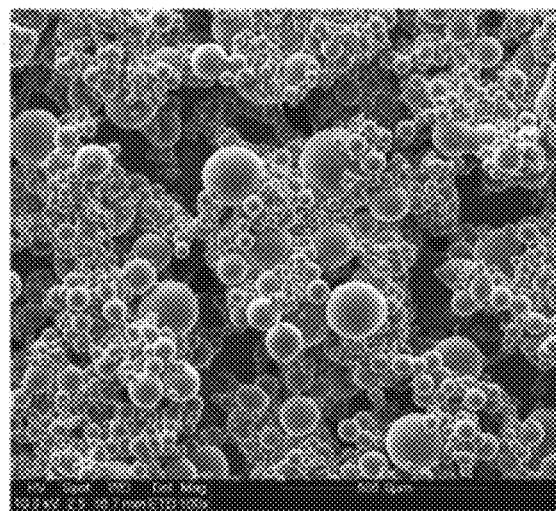
FIG. 15 is a SEM of the synthesized polymer-encapsulated mineral acid solution having 20 wt. % HCl core and a poly(PEG dimethacrylate) shell.
Figure 16A:
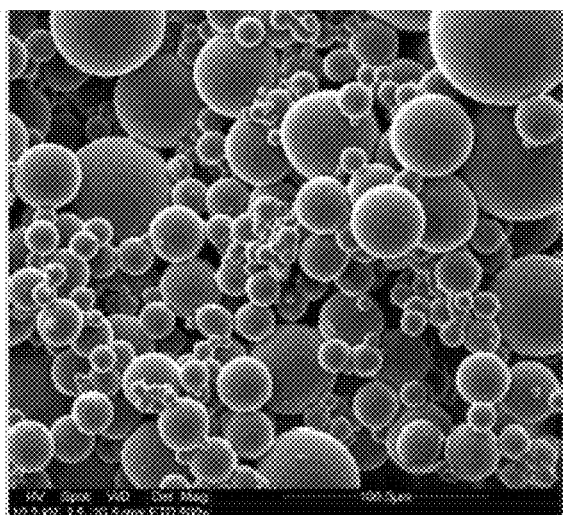
FIGS. 16A and 16B are SEMs of the synthesized polymer-encapsulated mineral acid solution having 20 wt. % HCl core and a poly(PEG dimethacrylate) shell after exposure to brine for 24 hours at 25° C.
Figure 16B:
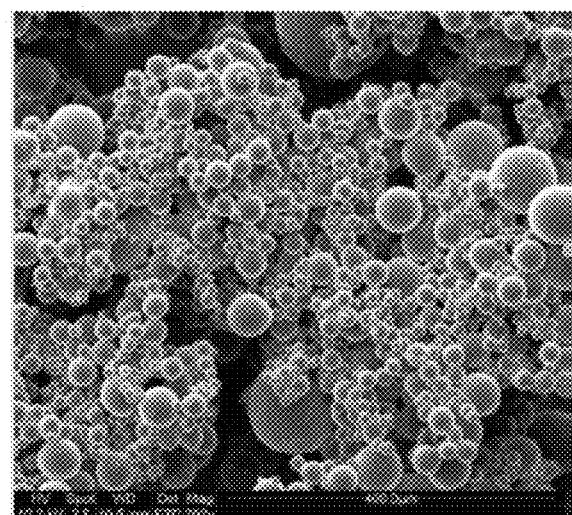

Polymer-encapsulated mineral acid solution having 20 wt. % HCl core and a polymer encapsulating shell made from poly(ethylene glycol) dimethacrylate (having an average PEG $M_n$ of about 600) monomer are synthesized using the double-emulsion W/O/W polymerization technique previously described. The ratio of monomer solution:strong mineral acid solution is about 1:1. The photo-initiator is about 2 wt % of the entire system. FIG. 15 is a SEM of the synthesized polymer-encapsulated mineral acid solution having 20 wt. % HCl core and a poly(PEG dimethacrylate) shell. The capsules at 500 μm resolution appear clean, smooth and well-formed. FIGS. 16A-B are SEMs of the synthesized polymer-encapsulated mineral acid solution having 20 wt. % HCl core and a poly(PEG dimethacrylate) shell after exposure to brine for 24 hours at 25° C. The brine is an aqueous solution containing 4 wt. % NaCl and 1 wt. % $CaCl_2$. Both SEMs show the same well-formed and smooth capsules. The capsules shown in FIGS. 16A-B appear unaffected by the external presence of the brine—the capsules appear solid and have not external pitting or deformities.

Figure 17:
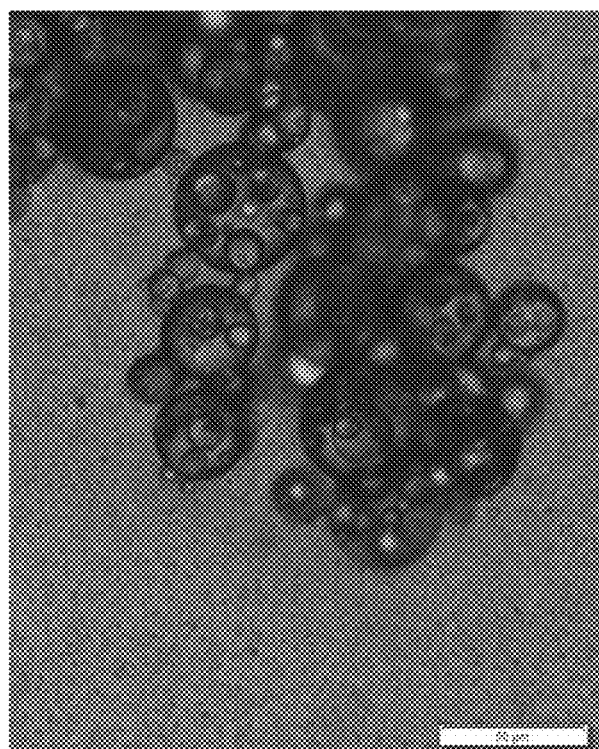
FIG. 17 is an optical microscopy image of the synthesized 1,6-hexanediol diacrylate polymer-encapsulated mineral acid solution having 20 wt. % HCl core.

Effects of Temperature on Acid Release from Polymer-encapsulated Mineral Acid Solution Polymer-encapsulated mineral acid solution having 20 wt. % HCl core and a polymer encapsulating shell made from 1,6-hexanediol diacrylate monomer are synthesized using the double-emulsion W/O/W polymerization technique previously described. Some acid solution loss occurred during formation of the capsules. The pH of the original aqueous dispersion containing the capsules initially is determined to be around 1.65. FIG. 17 is an optical microscopy image of the synthesized 1,6-hexanediol diacrylate polymer-encapsulated mineral acid solution having 20 wt. % HCl core. FIG. 17 image is at 50 μm resolution. The $T_g$ of the product polyacrylate shell is about 43° C.

The release profiles at several temperatures are determined using the synthesized 1,6-hexanediol diacrylate polymer-encapsulated mineral acid solution having 20 wt. % HCl core. Twenty mL of the original aqueous dispersion is distributed into 7 centrifuge tubes. For 6 of the samples, the synthesized capsules are washed down from their original solution with deionized water (no surfactant or additives). The 7th sample is a control. When the synthesized capsules are cleansed of external acid (pH strip of 6 or equivalent to deionized water), the washed synthesized capsules are suspended in fresh deionized water to form a suspension totaling 15 mL and introduced into a 20 mL scintillation vial. The number of capsules per sample is about $6\times10^6$ capsules in 15 mL in 1M of NaCl.

Three heated samples are placed into an oil bath maintained at 60° C. while three samples are maintained at "room temperature" of about 20° C. Note that the heated samples are maintained at a temperature higher than $T_g$ for the polyacryate and the room temperature samples are maintained at temperature below $T_g$. During each of the pH measurements, the heated samples are extracted from their oil bath and place in a bath at room temperature to increase the cooling process. All pH measurements are taken at room temperature to avoid any temperature-related drift in pH detection. The average pH for each sample at each period of detection is determined. The results are plotted on FIG. 18.

Figure 18:
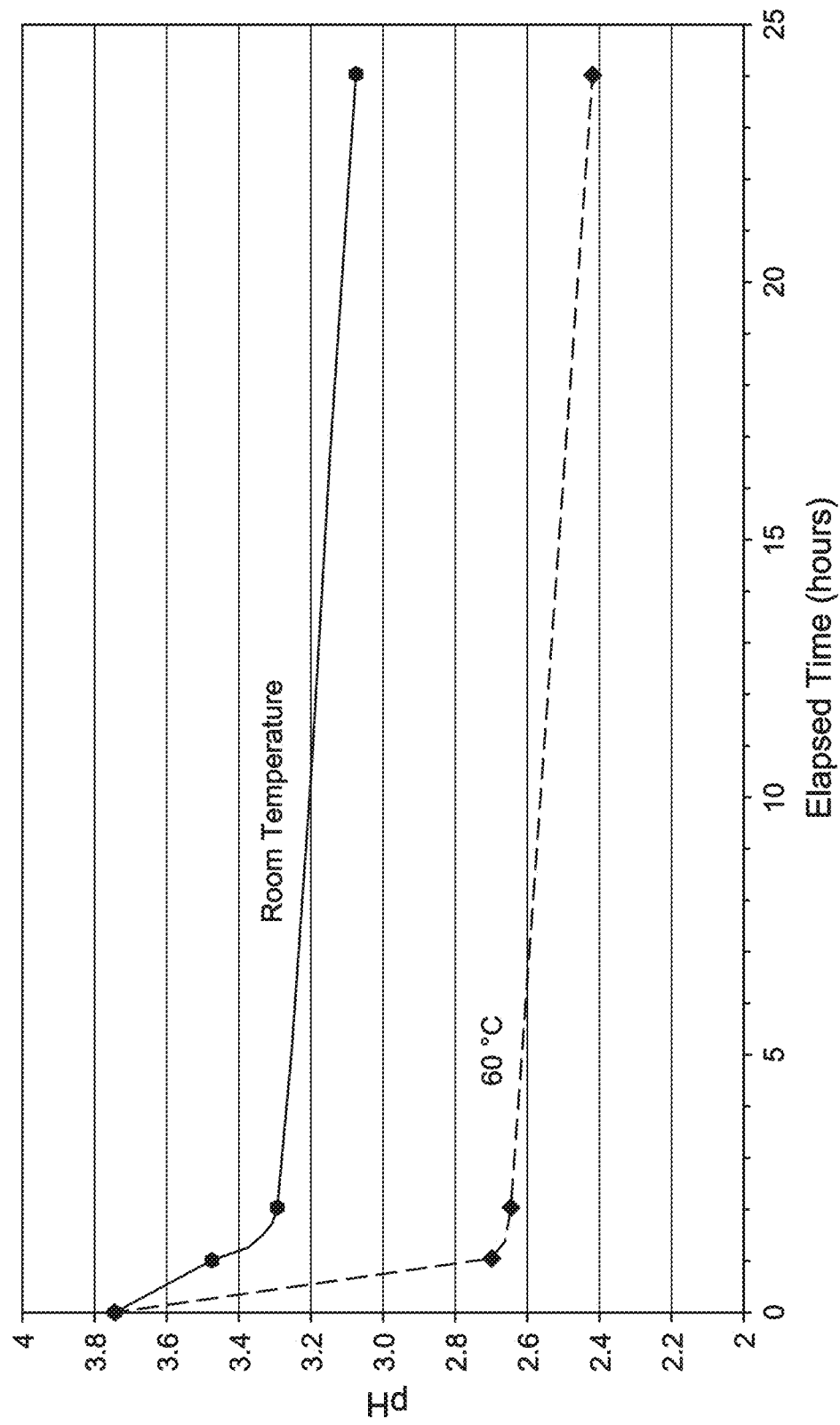
FIG. 18 is a graph showing traces for determined average pH versus time for 20 wt. % HCl core/poly(1,6-hexanediol diacrylate) shell capsules at less than and greater than $T_g$ temperatures.

FIG. 18 is a graph showing traces for determined average pH versus time for 20 wt. % HCl core/poly(1,6-hexanediol diacrylate) shell capsules below and above-$T_g$ temperature. The graph demonstrates the controlled release of the acid solution on the basis of temperature. Providing an environment where the temperature is maintained greater than the $T_g$ of the polymer results in a faster release of the encapsulated aqueous acid versus providing a sub-$T_g$ temperature. Acid diffusion does occur at room temperature, but at a much slower rate. This indicates a viable triggering mechanism for the polymer-encapsulated mineral acid solution (temperature elevation at or beyond $T_g$). The room temperature trace provides evidence of long-term acid diffusion through the polymer shell, which can provide a reduced rate etching to a formation that may beneficially maximize the depth of penetration for the strong mineral acid while in the polymer-encapsulated mineral acid solution.

Osmotic Balance in Water Phases for Double Emulsion Polymerization

FIGS. 13A-C show an exterior polymer shell for capsules having a 30 wt. % HCl strong mineral acid solution in the core. The shell pitting may be the result of an imbalance in osmotic pressure between the strong mineral acid solution, which has a high concentration of negative ions from the disassociated strong acid, and the second aqueous solution acting as the continuous phase of the double emulsion.

Three sets of polymer-encapsulated mineral acid solution are synthesized, where the continuous phase of the double emulsion—the second aqueous solution—is modified in each in regards to the objective in negative ion concentration (for strong acid addition) and for anion concentration (salt) to determine processing conditions for forming polymer-encapsulated mineral acid solution with strong mineral acid solution cores. For all three samples, the strong mineral acid solution and the second aqueous solution comprise solution of about 1 to about 2 wt. % TWEEN 80 and about 0.2 wt. % PLURONIC F-127 surfactants, water and the salt or acid materials and aqueous concentrations (Molar concentration) as given in Table 4. For forming the polymer shell, 1,6-hexanediol diacrylate monomer with about 2 wt. % SPAN 80 lipophilic surfactant and about 3 wt. % DTBP photo-initiator are introduced and form the monomer solution. The double emulsion pre-capsules are formed as previously described. The capsules are cured using the ELC-403 light curing system as previously described.

TABLE 4

Osmotic balance Samples 1-3 with different concentrations of core and continuous phase materials.

| Sample No. | Core material (molarity) | Continuous phase material (molarity) |
|---|---|---|
| Sample 1 | HCl [6.12M] | NaCl [2M] |
| Sample 2 | NaCl [5.7M] | NaCl [5.7M] |
| Sample 3 | HCl [5.7M] | NaCl [5.7] |

Figure 19:
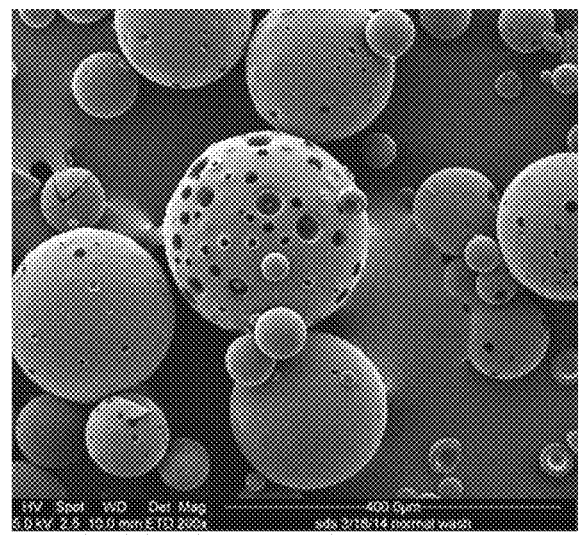
FIG. 19 is a SEM of synthesized polymer-encapsulated mineral acid solution formed in an osmotically unbalanced system.
Figure 20:
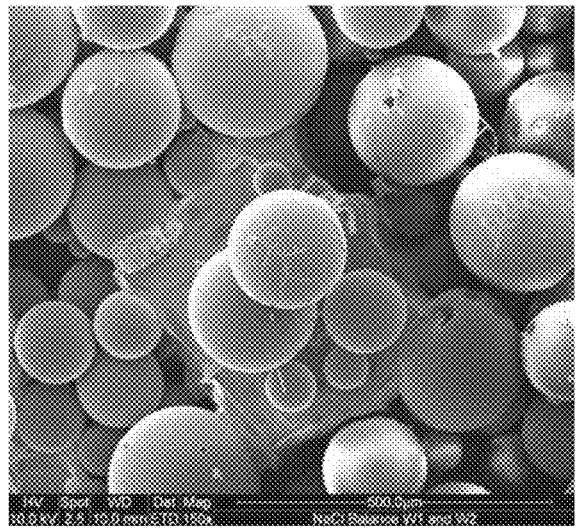
FIG. 20 is a SEM of synthesized polymer-encapsulated mineral acid solution formed in osmotically balanced system (NaCl/NaCl)
Figure 21:
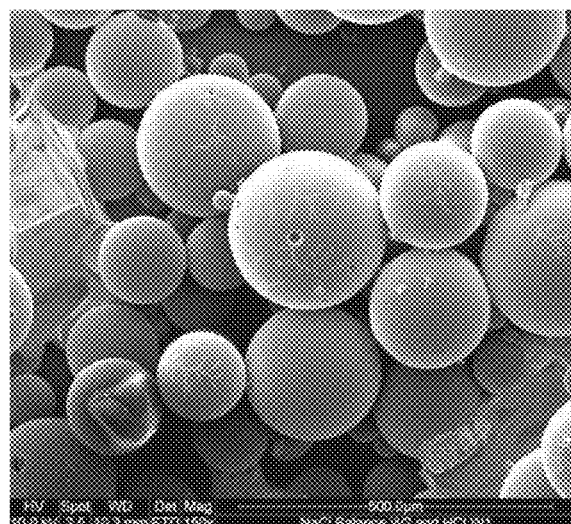
FIG. 21 is a SEM of synthesized polymer-encapsulated mineral acid solution formed in osmotically balanced system (NaCl/HCl)

The formed capsules for Sample 1 are shown in FIG. 19. The formed capsules for Sample 2 are shown in FIG. 20. The formed capsules for Sample 3 are shown in FIG. 21. FIG. 19 is a SEM of synthesized polymer-encapsulated mineral acid solution formed in an osmotically unbalanced system. FIG. 19 shows capsules where there is about a 4M negative ion/anion concentration difference between the strong mineral acid solution and the second aqueous solution. Large amounts of surface pits are shown similar to FIGS. 13A-C. Although not wanting to be limited by theory, it is believed that the more dilute second aqueous solution pushed into and through the forming polymers shell. The pores prevent proper containment of the acid core. FIGS. 20 (NaCl interior and exterior) and 21 (HCl interior; NaCl exterior) show SEMs of synthesized polymer-encapsulated mineral acid solution formed in osmotically balanced system.

FIGS. 20 and 21 appear to indicate that adding salt (or acid) to align the outer and inner ion concentration of the two aqueous solutions provides osmotic balance to the process, which produces much fewer pores in the polymer shells. FIGS. 10A-C and 11A-C indicate that a perfect balance is not required. Both sets of capsules formed under the conditions described for their formation—believed to be imbalanced—do not show a significant amount of surface pitting. Therefore, it is believed that some osmotic pressure imbalance—at least enough not to overcome the speed and strength of the forming polymer shell—between the two aqueous phases is acceptable.

Figure 22:
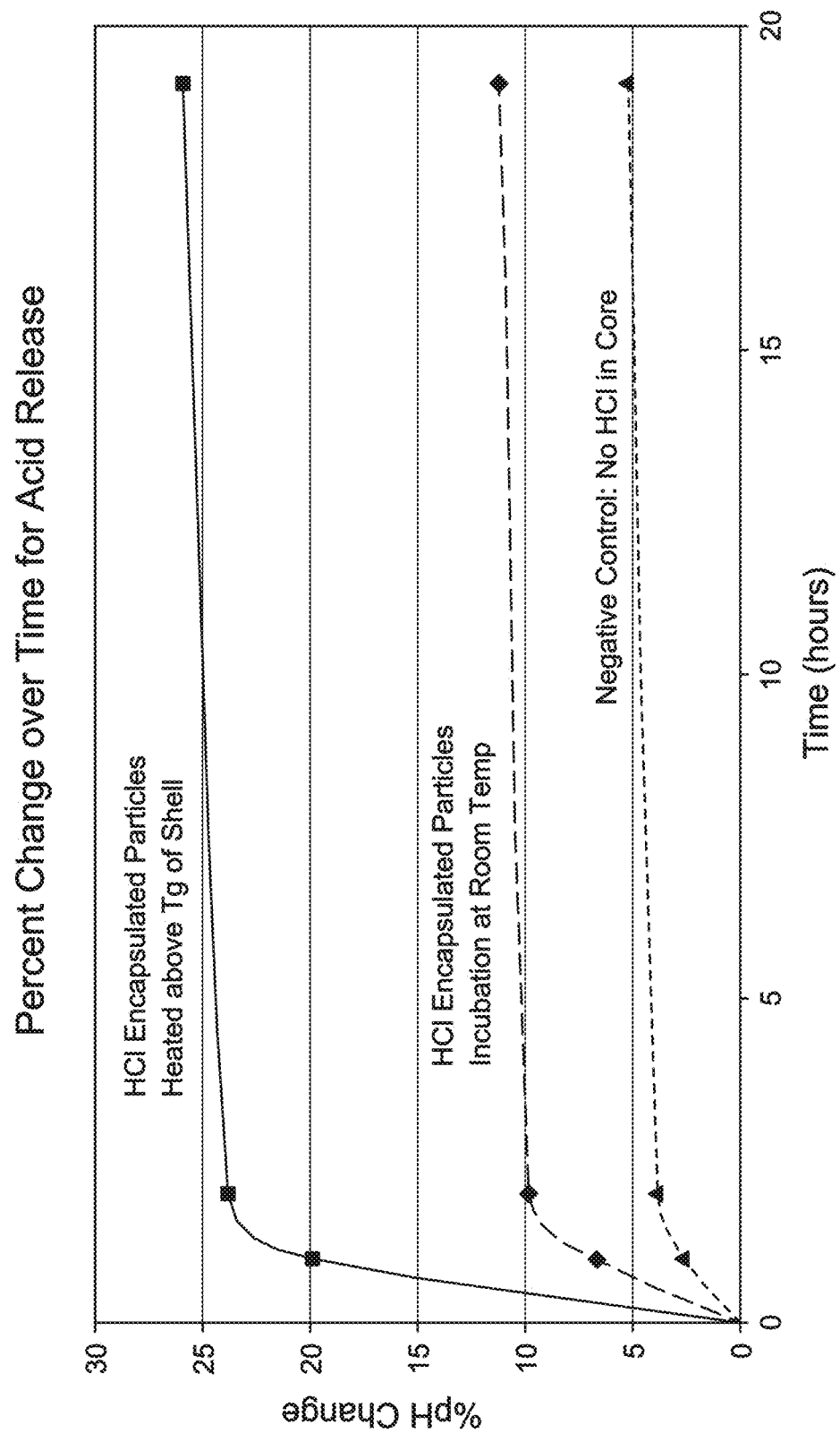
FIG. 22 is a graph showing traces for determined change in average pH versus time for osmotically-balanced HCl [5.7M] core/poly(1,6-hexanediol diacrylate) shell capsules below and above-$T_g$ temperature and for similarly osmotically-balanced NaCl [5.7M] capsules.

The effect of temperature was tested on the osmotically-balanced capsules with NaCl (Sample 2) and HCl in their cores (Sample 3). Sample 2 acts as a "negative control", while the Sample 3 capsules are split into two sets: a set that is warmed above the $T_g$ of the polymer shell (80° C.) and the other maintained at room temperature (20° C.) similar to the procedure previously described to produce the results shown in FIG. 18 (cooling heated sample to room temperature before taking pH). FIG. 18 is a graph showing traces for determined change in average pH versus time for osmotically-balanced HCl [5.7M] core/poly(1,6-hexanediol diacrylate) shell capsules below and above-$T_g$ temperature and for similarly osmotically-balanced NaCl [5.7M] capsules. Similar to the results given in FIG. 18, the capsules elevated beyond $T_g$ degrade quickly and release their acid solution core into the surrounding solution, whereas the capsules at room temperature more gently diffuse after an initial release of acid solution from thinner-walled capsules. Each data point shown in FIG. 22 is an average of two measurements taken at each time for each temperature exposure. The heated capsules were taken to 80° C. and then cooled prior to measuring. All pH measurements were taken at room temperature to ensure minimal variation between samples. This helps to confirm that introduction into the well bore at a sub-Tg temperature and permitting the formation to elevate the temperature through natural processes can permit the deep introduction of capsules into fissures and fractures before the polymer shell thermally degrades and releases its acid core for a majority of the capsules. The release of acid solution from capsules that do so at sub-$T_g$ temperatures may assist in "clearing the path" for other, more intact and resilient capsules to penetrate deep into the formation, where they can then warm and thermally degrade deeper in the formation.

Negative Example—Attempted Encapsulation of Hcl Acid Solution using Double Emulsion Polymerization with Epoxy Functional End Group Monomers Free-radical chain polymerization appears to be unaffected by the strong acid present in the strong mineral acid solution of the core of the capsule. Step polymerization, such as how epoxy functional end group monomers react with one another and comonomers, however, appears to be greatly affected by the presence of the strong mineral acid.

The procedure as given for forming the urethane acrylate monomer (SARTOMER CN9013) polymers shell-based capsules (See "Encapsulation of acid solution using double emulsion polymerization" supra) is used with minor differences to account for the epoxy experiment. The organic solution for forming the primary emulsion contains EPON Resin 862 (Momentive Specialty Chemicals; Houston, Tex.), which is a diglycidyl ether of Bisphenol F, for the monomer instead of an acrylate. The curative in the monomer solution is Amicure PACM (Air Products & Chemicals; Allentown, Pa.), which is a thermally-activated curative agent for epoxy systems. The monomer solution comprises 11.445 grams EPON Resin 862, 3.55 grams Americure PACM curative, 0.45 grams SPAN 80, and 11.49 grams chloroform. The strong mineral acid solution for forming the primary emulsion is the same except it only contains 1 wt. % HCl instead of 10-30 wt. % HCl and TWEEN® 20 (Sigma-Aldrich P2287) is substituted for TWEEN 80. The strong mineral acid solution is a combination of 200 μL of 37 wt. % HCl and 924 μL of a solution comprising 36 mg of PVA, 11 mg of TWEEN 20, 23 mg of NaCl and 2.625 mL of deionized water. The second aqueous solution is the same as previously described. With the low HCl concentration, there is no need for compensating for any difference in osmotic effects while the capsule forms during secondary emulsification and curing. The pre-capsule double emulsion is cured thermally at 50° C. for 2 hours to form the cured epoxy polymer-encapsulated mineral acid solution.

Figure 23A:
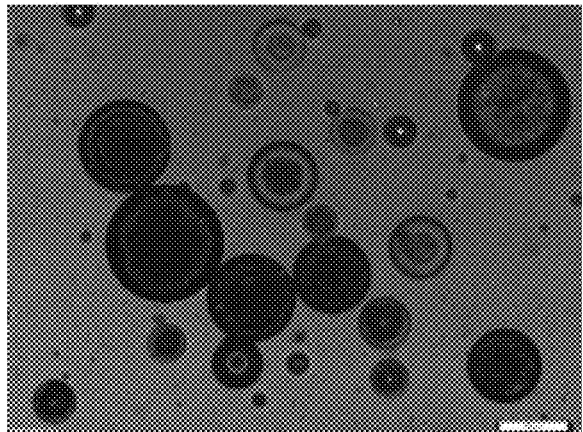
FIGS. 23A, 23B, and 23C are optical microscopy images of the synthesized epoxy polymer-encapsulated mineral acid solution having 1 wt. % HCl cores.
Figure 23B:
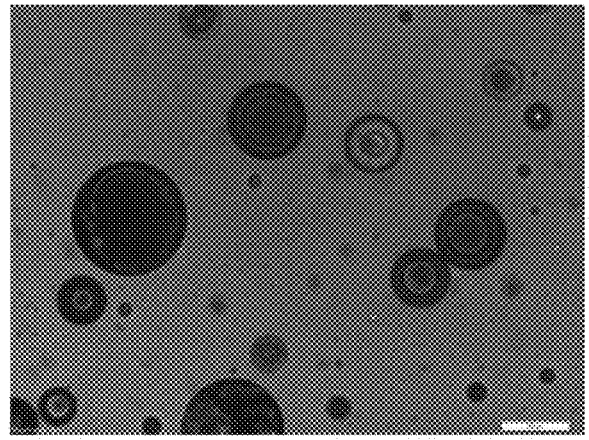
Figure 23C:
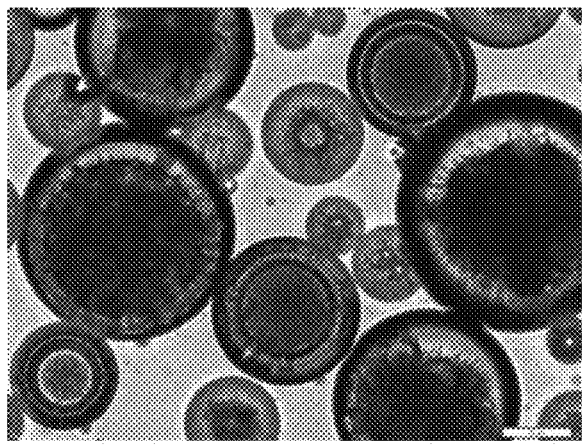
Figure 24A:
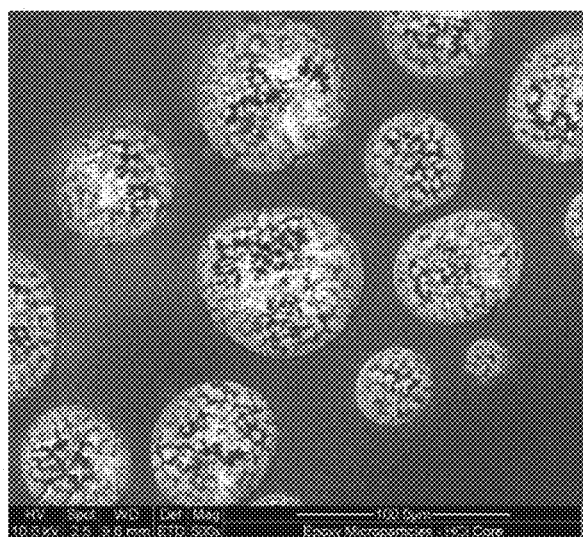
FIGS. 24A and 24B are SEMs of synthesized epoxy polymer-encapsulated mineral acid solution and resultant salts.
Figure 24B:
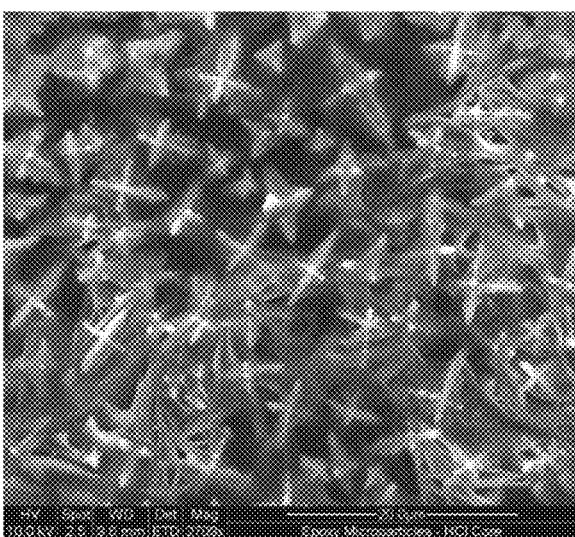

FIGS. 23A-C are optical microscopy images of the synthesized epoxy polymer-encapsulated mineral acid solution having 1 wt. % HCl cores. During initial examination, there appears to be formed capsules having epoxy shells and acid solution cores. The resolution of FIGS. 23A and B is 100 µm, the resolution of FIG. 23C is 50 µm. FIGS. 24A-B are SEMs images of synthesized epoxy polymer-encapsulated mineral acid solution and resultant salts. Before or during the attempt to analyze the capsules using SEM, the epoxy-based shell capsules destabilized and collapsed, resulting in the formation of salt capsules in the shapes of the liquid core. FIG. 24A is at 100 µm resolution; FIG. 24B is at 20 µm resolution.

A second attempt to synthesize epoxy polymer-encapsulated mineral acid solution uses neutral water as the core material for forming a first capsule using the EPON Resin 862. A second capsule with a 1 wt. % aqueous mineral acid solution core is formed using the same procedure as previously given. Both sets of capsules are examined using SEM micrography.

Figure 25A:
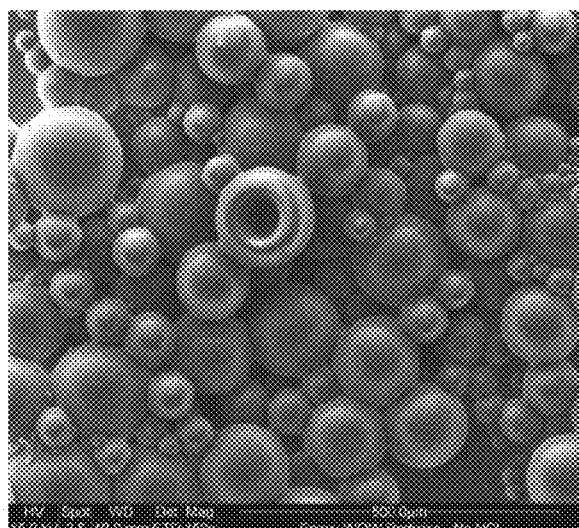
FIGS. 25A and 25B are SEMs of the synthesized epoxy polymer-encapsulated neutral water.
Figure 25B:
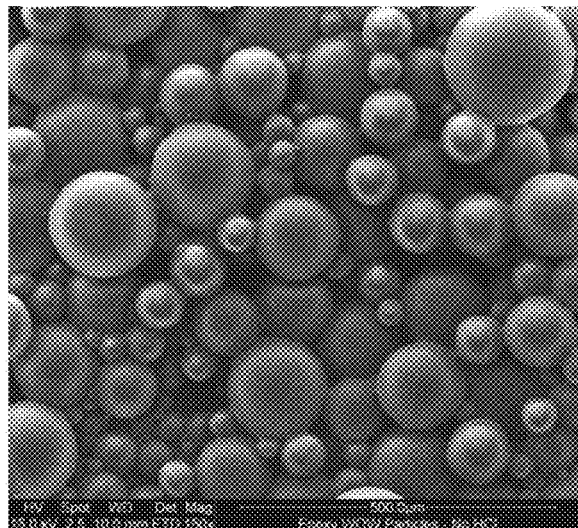
Figure 26A:
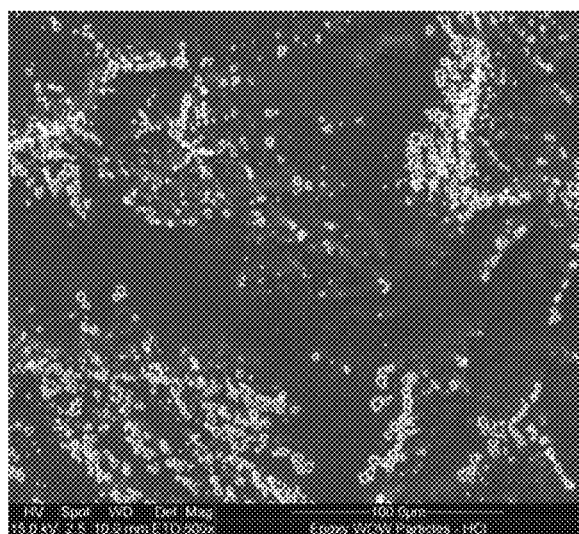
FIGS. 26A and 26B are SEMs of resultant salts from attempting to synthesize epoxy polymer-encapsulated mineral acid solution.
Figure 26B:
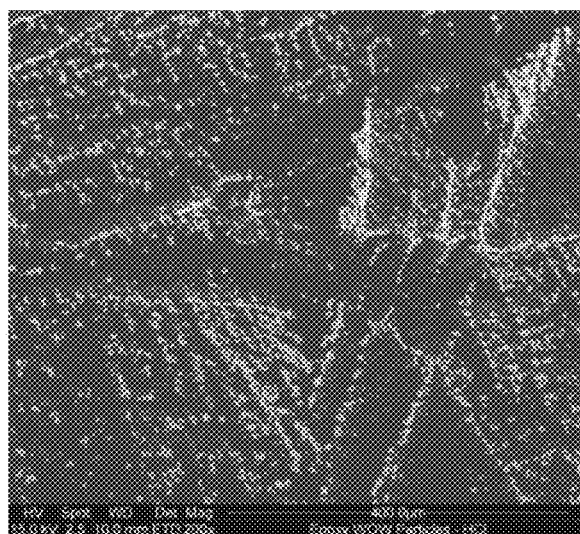

FIGS. 25A-B are SEMs of the synthesized epoxy polymer-encapsulated neutral water capsules. The neutral water core capsules appear to have a smooth external surface without and well-formed. The resolution of FIGS. 25A-B is 500 µm. FIGS. 26A-B are SEMs of resultant salts from attempting to synthesize epoxy polymer-encapsulated mineral acid solution. After encapsulation of the 1 wt. % HCl, it appears that the formed capsules once again are not stable. FIG. 26 show only resultant salt crystals and no epoxy shell capsules. Although not wanting to be bound by theory, the proton donation effect of the strong mineral acid likely interferes with the step polymerization reaction of the epoxy end groups by cleaving the epoxy ring. This results in a non-fully incorporated shell that collapses easily and releases the core material.

What is claimed is:

1. A method of stimulating a hydrocarbon-bearing formation using a polymer-encapsulated mineral acid solution, the method comprising:
   introducing a polymer-encapsulated mineral acid solution suspension into a fissure traversing the hydrocarbon-bearing formation to be stimulated,
      where the polymer-encapsulated mineral acid solution suspension comprises a suspension fluid and the polymer-encapsulated mineral acid solution,
      where the polymer-encapsulated mineral acid solution comprises:
         a strong mineral acid solution where a strong mineral acid is in a range of from greater than 0 wt. % to about 30 wt. % of the strong mineral acid solution, and
         a polymerized shell that encapsulates the strong mineral acid solution such that the polymerized shell encapsulates and prevents interaction with the strong mineral acid solution until the polymerized shell degrades, where the strong mineral acid solution does not degrade the polymerized shell, wherein the polymerized shell comprises a homopolymer, wherein the homopolymer comprises a polymerized monomer having acrylate end group functionality, the polymerized monomer having acrylate end group functionality selected from the group consisting of 1,6-hexanediol diacrylate, 1,1,1-trimethylolpropane triacrylate, 2,2-bis[4-(2-acryloxyethoxy)phenyl]propane, dipentaerythritol pentaacrylate, and a urethane-acrylate oligomer; and
   maintaining the polymer-encapsulated mineral acid solution suspension within the fissure such that the polymerized shell degrades within the fissure, such that the strong mineral acid solution is released into the fissure of the hydrocarbon-bearing formation, and the hydrocarbon-bearing formation is stimulated,
      where a well bore is defined by a well bore wall and traverses the hydrocarbon-bearing formation,
      where a face is a portion of the well bore wall associated with and operable to provide fluid communication between the hydrocarbon-bearing formation and the well bore, and
      where the fissure in the hydrocarbon-bearing formation is accessible through the face.

2. The method of claim 1 where the strong mineral acid is selected from the group consisting of hydrochloric acid (HCl), hydrofluoric acid (HF), sulfuric acid (H2SO4), nitric acid (HNO3) and combinations thereof.

3. The method of claim 1 where the suspension fluid is a brine.

4. The method of claim 1 where the polymerized shell is the resultant of a free-radical chain polymerization reaction.

5. The method of claim 1 where the polymerized shell has a glass transition temperature (Tg) and the Tg is in a range of from 43° C. to 151° C.

6. The method of claim 1 where the polymerized shell does not have a glass transition temperature (Tg).

7. A method of stimulating a hydrocarbon-bearing formation using a polymer-encapsulated mineral acid solution, the method comprising:
   introducing a polymer-encapsulated mineral acid solution suspension into a fissure traversing the hydrocarbon-bearing formation to be stimulated,
      where the polymer-encapsulated mineral acid solution suspension comprises a suspension fluid and the polymer-encapsulated mineral acid solution,
      where the polymer-encapsulated mineral acid solution comprises:
         a strong mineral acid solution where a strong mineral acid is in a range of from greater than 0 wt. % to about 30 wt. % of the strong mineral acid solution, and
         a polymerized shell that encapsulates the strong mineral acid solution such that the polymerized shell encapsulates and prevents interaction with the strong mineral acid solution until the polymerized shell degrades, where the strong mineral acid solution does not degrade the polymerized shell, wherein the polymerized shell comprises a homopolymer, wherein the homopolymer comprises a polymerized monomer having methacrylate end group functionality, the polymerized monomer having methacrylate end group functionality selected from the group consisting of diurethane dimethacrylate, Bisphenol-A glycerolate dimethacrylate, poly(ethylene glycol) dimethacrylate (having an average poly(ethylene glycol) (PEG) $M_n$ of about 600), and 1,6-hexanediol dimethacrylate; and
   maintaining the polymer-encapsulated mineral acid solution suspension within the fissure such that the polymerized shell degrades within the fissure, such that the strong mineral acid solution is released into the fissure of the hydrocarbon-bearing formation, and the hydrocarbon-bearing formation is stimulated,
      where a well bore is defined by a well bore wall and traverses the hydrocarbon-bearing formation, where a face is a portion of the well bore wall associated with and operable to provide fluid communication between the hydrocarbon-bearing formation and the well bore, and where the fissure in the hydrocarbon-bearing formation is accessible through the face.

8. The method of claim 7 where the strong mineral acid is selected from the group consisting of hydrochloric acid (HCl), hydrofluoric acid (HF), sulfuric acid (H2SO4), nitric acid (HNO3) and combinations thereof.

9. The method of claim 7 where the suspension fluid is a brine.

10. The method of claim 7 where the polymerized shell is the resultant of a free-radical chain polymerization reaction.

11. The method of claim 7 where the polymerized shell has a glass transition temperature (Tg) and the Tg is in a range of from 43° C. to 151° C.

12. The method of claim 7 where the polymerized shell does not have a glass transition temperature (Tg).

* * * * *